United States Patent
Bishnoi et al.

(10) Patent No.: US 10,877,971 B2
(45) Date of Patent: Dec. 29, 2020

(54) LOGICAL QUERIES IN A DISTRIBUTED STREAM PROCESSING SYSTEM

(71) Applicant: Oracle International Corporation, Redwood Shores, CA (US)

(72) Inventors: Sandeep Bishnoi, Pleasanton, CA (US); Hoyong Park, San Jose, CA (US); Iuliia Shmeleva, San Francisco, CA (US); Vitaly Vitalievich Bychkov, Foster City, CA (US); Gyorgy Geiszter, Budapest (HU); Péter Gordos, Budapest (HU)

(73) Assignee: Oracle International Corporation, Redwood Shores, CA (US)

( * ) Notice: Subject to any disclaimer, the term of this patent is extended or adjusted under 35 U.S.C. 154(b) by 209 days.

(21) Appl. No.: 16/147,622

(22) Filed: Sep. 29, 2018

(65) Prior Publication Data

US 2019/0102431 A1 Apr. 4, 2019

Related U.S. Application Data

(60) Provisional application No. 62/565,483, filed on Sep. 29, 2017.

(51) Int. Cl.
| | |
|---|---|
| *G06F 16/00* | (2019.01) |
| *G06F 16/2455* | (2019.01) |
| *G06N 7/08* | (2006.01) |
| *G06F 16/2452* | (2019.01) |
| *G06F 16/2453* | (2019.01) |
| *G06N 5/02* | (2006.01) |

(52) U.S. Cl.
CPC .... *G06F 16/24554* (2019.01); *G06F 16/2452* (2019.01); *G06F 16/24532* (2019.01); *G06F 16/24544* (2019.01); *G06F 16/24568* (2019.01); *G06N 7/08* (2013.01); *G06N 5/022* (2013.01)

(58) Field of Classification Search
CPC .......... G06F 16/2452; G06F 16/24532; G06F 16/24544; G06F 16/24554; G06F 16/24568; G06N 5/02; G06N 7/08
See application file for complete search history.

(56) References Cited

U.S. PATENT DOCUMENTS

| | | |
|---|---|---|
| 7,403,959 B2 | 7/2008 | Nishizawa et al. |
| 7,996,388 B2 | 8/2011 | Jain et al. |
| 8,386,466 B2 | 2/2013 | Park et al. |

(Continued)

*Primary Examiner* — Diedra McQuitery
(74) *Attorney, Agent, or Firm* — Kilpatrick Townsend & Stockton LLP

(57) ABSTRACT

Techniques for implementing logical queries in a distributed stream processing system using automatic branching and joins. An exemplary technique includes determining a query is a logical query. The logical query includes two or more summaries based on different groups configured to execute in a single query stage of a stream analytics application. The technique further includes converting the logical query into one or more physical queries. The one or more physical queries are separated into individual query stages, and each of the query stages includes a summary from the two or more summaries that is based on an associated group. The technique further includes generating a directed acyclic graph for the one or more physical queries. The directed acyclic graph includes a physical query transformation for each of the individual query stages.

12 Claims, 9 Drawing Sheets

(56) References Cited

U.S. PATENT DOCUMENTS

| | | | | |
|---|---|---|---|---|
| 10,318,491 | B1* | 6/2019 | Graham | G06F 16/182 |
| 2006/0218123 | A1* | 9/2006 | Chowdhuri | G06F 16/24532 |
| 2007/0027905 | A1* | 2/2007 | Warren | G06F 8/51 |
| 2008/0077557 | A1* | 3/2008 | Schneider | G06F 16/24553 |
| 2011/0153593 | A1* | 6/2011 | Zhou | G06F 16/24537 |
| | | | | 707/718 |
| 2011/0173231 | A1 | 7/2011 | Drissi et al. | |
| 2012/0166469 | A1* | 6/2012 | Cammert | G06F 16/24568 |
| | | | | 707/769 |
| 2012/0310916 | A1* | 12/2012 | Abadi | G06F 16/24542 |
| | | | | 707/713 |
| 2014/0095444 | A1* | 4/2014 | Deshmukh | G06F 16/24542 |
| | | | | 707/661 |
| 2014/0095537 | A1* | 4/2014 | Park | G06F 16/951 |
| | | | | 707/770 |
| 2014/0358959 | A1 | 12/2014 | Bishnoi et al. | |
| 2018/0314732 | A1* | 11/2018 | Armbrust | G06F 16/24568 |

* cited by examiner

LOGICAL QUERIES IN A DISTRIBUTED STREAM PROCESSING SYSTEM

CROSS REFERENCE TO RELATED APPLICATION

This application claims priority to U.S. Provisional Application No. 62/565,483 filed on Sep. 29, 2017, the entirety of which is incorporated herein by reference.

FIELD OF THE INVENTION

The present disclosure relates generally to complex event processing, and more particularly, to techniques for implementing logical queries in a distributed stream processing system.

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. Such applications have given rise to a need for a new breed of applications that can process the data streams. For example, a temperature sensor may be configured to send out temperature readings in a continuous manner and hardware components or software applications need to be able to process (e.g., query) the continuous and ever changing stream of data.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's event processing needs. Accordingly, new techniques are desired for processing continuous data or event streams.

BRIEF SUMMARY

Techniques are provided (e.g., a method, a system, non-transitory computer-readable medium storing code or instructions executable by one or more processors) for implementing logical queries in a distributed stream processing system.

In various embodiments, a method is provided for that includes determining a query is a logical query. The logical query includes two or more summaries based on different groups configured to execute in a single query stage of a stream analytics application. The method further includes converting the logical query into one or more physical queries. The one or more physical queries are separated into individual query stages, and each of the query stages includes a summary from the two or more summaries that is based on an associated group. The method further includes generating a directed acyclic graph for the one or more physical queries. The directed acyclic graph includes a physical query transformation for each of the individual query stages.

In some embodiments, the determining the query is the logical query includes determining the logical query comprises a first summary of the two or more summaries based on a first group of the different groups and a second summary of the two or more summaries based on a second group of the different groups, and where the first group is different from the second group.

In some embodiments, the converting the logical query to the one or more physical queries includes parsing the logical query into the first summary based on the first group and the second summary based on the second group, and translating logical syntax and semantics for the first summary based on the first group into physical syntax and semantics for a first physical query comprising the first summary based on the first group and physical syntax and semantics for a second physical query comprising the second summary based on a second group.

In some embodiments, the first physical query is configured to execute in a first query stage and the second physical query is configured to execute in a second query stage. Optionally, the directed acyclic graph comprises the first query stage as a first physical query transformation, the second query stage as a second physical query transformation, and a join transformation to join output from each of the first physical query transformation and the second physical query transformation into a single output shape.

In some embodiments, the method further comprises: determining whether parallelism is exhibited in each of the one or more physical queries, when parallelism is not exhibited in a physical query of the one or more physical queries, determining an input stream is to be partitioned or repartitioned for the physical query, when the input stream is to be partitioned or repartitioned for the physical query, creating a partition transformation for the physical query. Optionally, the partition transformation is incorporated into the directed acyclic graph prior to the physical query transformation for the physical query.

In some embodiments, the creating the partition transformation includes determining a partitioning criteria for the physical query, where the partitioning criteria is an attribute within physical syntax of the physical query that is acted upon or part of a function or transformation that causes the physical query to not exhibited parallelism.

In various embodiments, a system is provided for that comprises a data processing system that includes one or more processors and non-transitory machine readable storage medium having instructions stored thereon that when executed by the one or more processors cause the one or more processors to perform a process comprising determining a query is a logical query. The logical query includes two or more summaries based on different groups configured to execute in a single query stage of a stream analytics application. The process further includes converting the logical query into one or more physical queries. The one or more physical queries are separated into individual query stages, and each of the query stages includes a summary from the two or more summaries that is based on an associated group.

The process further includes generating a directed acyclic graph for the one or more physical queries. The directed acyclic graph includes a physical query transformation for each of the individual query stages.

In some embodiments, the process further comprises: reading, at the primary server of a data processing system, the input events from an input source; reading, at the one or more secondary servers of the data processing system, the input events from the input source; pausing, by the new primary server of the data processing system, the processing the input events and the writing of the secondary output events for at least the new primary server upon the election of the new primary server; and unpausing, by the new primary server of the data processing system, the processing the input events and the writing of the secondary output events for at least the new primary server upon the writing the failed primary output events to the primary target.

In some embodiments, the determining the query is the logical query includes determining the logical query comprises a first summary of the two or more summaries based on a first group of the different groups and a second summary of the two or more summaries based on a second group of the different groups, and where the first group is different from the second group.

In some embodiments, the converting the logical query to the one or more physical queries includes parsing the logical query into the first summary based on the first group and the second summary based on the second group, and translating logical syntax and semantics for the first summary based on the first group into physical syntax and semantics for a first physical query comprising the first summary based on the first group and physical syntax and semantics for a second physical query comprising the second summary based on a second group.

In some embodiments, the first physical query is configured to execute in a first query stage and the second physical query is configured to execute in a second query stage. Optionally, the directed acyclic graph comprises the first query stage as a first physical query transformation, the second query stage as a second physical query transformation, and a join transformation to join output from each of the first physical query transformation and the second physical query transformation into a single output shape.

In some embodiments, the process further comprises: determining whether parallelism is exhibited in each of the one or more physical queries, when parallelism is not exhibited in a physical query of the one or more physical queries, determining an input stream is to be partitioned or repartitioned for the physical query, when the input stream is to be partitioned or repartitioned for the physical query, creating a partition transformation for the physical query. Optionally, the partition transformation is incorporated into the directed acyclic graph prior to the physical query transformation for the physical query.

In some embodiments, the creating the partition transformation includes determining a partitioning criteria for the physical query, where the partitioning criteria is an attribute within physical syntax of the physical query that is acted upon or part of a function or transformation that causes the physical query to not exhibited parallelism.

In various embodiments, a non-transitory machine readable storage medium is provided for that has instructions stored thereon that when executed by one or more processors cause the one or more processors to perform a method comprising determining a query is a logical query. The logical query includes two or more summaries based on different groups configured to execute in a single query stage of a stream analytics application. The process further includes converting the logical query into one or more physical queries. The one or more physical queries are separated into individual query stages, and each of the query stages includes a summary from the two or more summaries that is based on an associated group. The process further includes generating a directed acyclic graph for the one or more physical queries. The directed acyclic graph includes a physical query transformation for each of the individual query stages.

In some embodiments, the process further comprises: reading, at the primary server of a data processing system, the input events from an input source; reading, at the one or more secondary servers of the data processing system, the input events from the input source; pausing, by the new primary server of the data processing system, the processing the input events and the writing of the secondary output events for at least the new primary server upon the election of the new primary server; and unpausing, by the new primary server of the data processing system, the processing the input events and the writing of the secondary output events for at least the new primary server upon the writing the failed primary output events to the primary target.

In some embodiments, the determining the query is the logical query includes determining the logical query comprises a first summary of the two or more summaries based on a first group of the different groups and a second summary of the two or more summaries based on a second group of the different groups, and where the first group is different from the second group.

In some embodiments, the converting the logical query to the one or more physical queries includes parsing the logical query into the first summary based on the first group and the second summary based on the second group, and translating logical syntax and semantics for the first summary based on the first group into physical syntax and semantics for a first physical query comprising the first summary based on the first group and physical syntax and semantics for a second physical query comprising the second summary based on a second group.

In some embodiments, the first physical query is configured to execute in a first query stage and the second physical query is configured to execute in a second query stage. Optionally, the directed acyclic graph comprises the first query stage as a first physical query transformation, the second query stage as a second physical query transformation, and a join transformation to join output from each of the first physical query transformation and the second physical query transformation into a single output shape.

In some embodiments, the method further comprises: determining whether parallelism is exhibited in each of the one or more physical queries, when parallelism is not exhibited in a physical query of the one or more physical queries, determining an input stream is to be partitioned or repartitioned for the physical query, when the input stream is to be partitioned or repartitioned for the physical query, creating a partition transformation for the physical query. Optionally, the partition transformation is incorporated into the directed acyclic graph prior to the physical query transformation for the physical query.

In some embodiments, the creating the partition transformation includes determining a partitioning criteria for the physical query, where the partitioning criteria is an attribute within physical syntax of the physical query that is acted upon or part of a function or transformation that causes the physical query to not exhibited parallelism.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
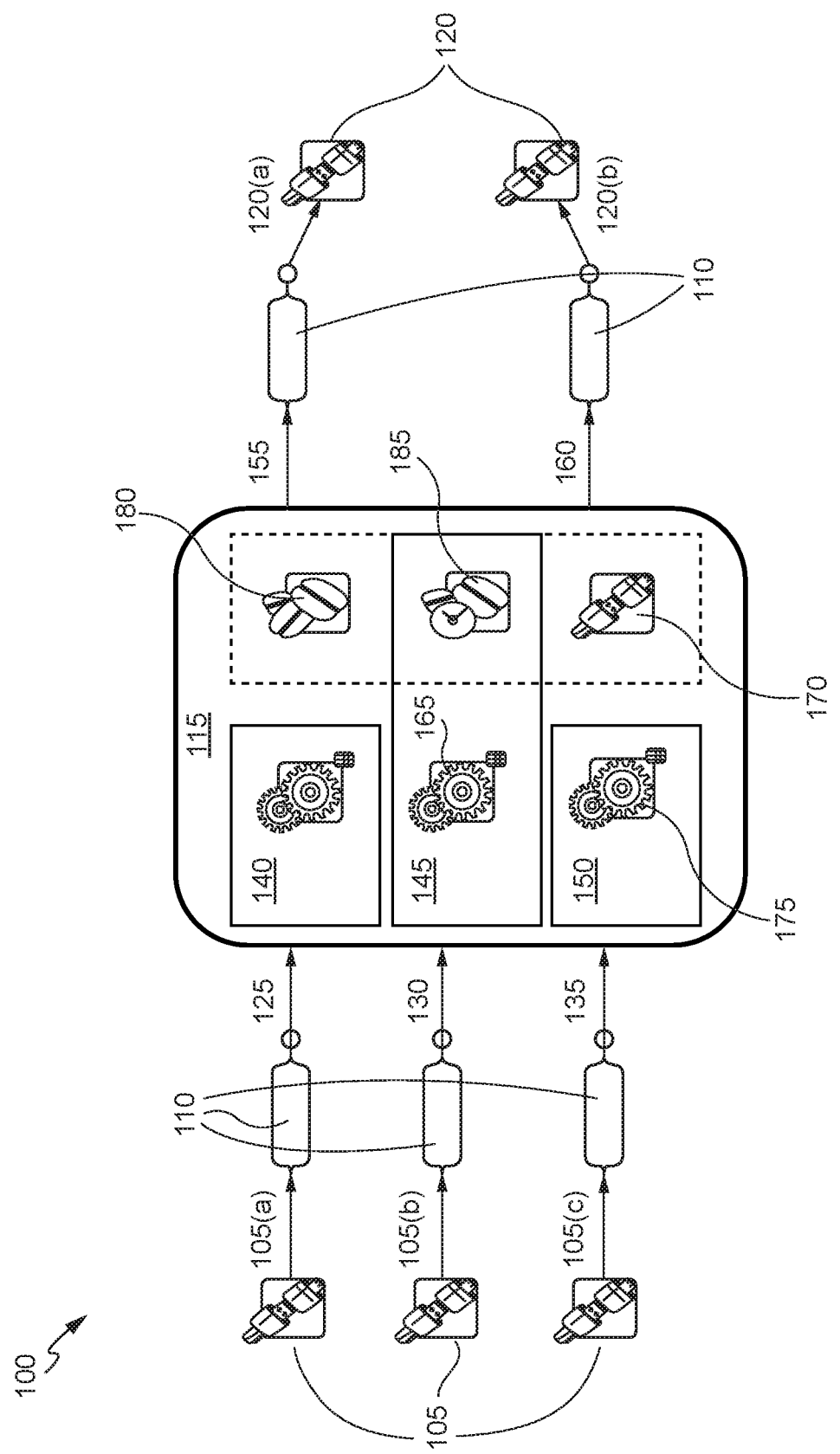
FIG. 1 is an illustration of a stream analytics system in which techniques for receiving and processing data streaming from an event source may be implemented in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Overview of Complex Event Processing (CEP)

Complex Event Processing (CEP) provides a modular platform for building applications based on an event-driven architecture. At the heart of the CEP platform is the Continuous Query Language (CQL), which allows applications to filter, query, and perform pattern matching operations on streams of data using a declarative, SQL-like language. Developers may use CQL in conjunction with a lightweight Java programming model to write applications. Other platform modules include a feature-rich IDE, management console, clustering, distributed caching, event repository, and monitoring, to name a few.

As event-driven architecture and complex event processing have become prominent features of the enterprise computing landscape, more and more enterprises have begun to build mission-critical applications using CEP technology. Today, mission-critical CEP applications can be found in many different industries. For example, CEP technology is being used in the power industry to make utilities more efficient by allowing them to react instantaneously to changes in demand for electricity. CEP technology is being used in the credit card industry to detect potentially fraudulent transactions as they occur in real time. The list of mission-critical CEP applications continues to grow. The use of CEP technology to build mission-critical applications has led to a need for CEP applications to be made highly available and fault-tolerant.

Today's Information Technology (IT) environments generate continuous streams of data for everything from monitoring financial markets and network performance, to business process execution and tracking RFID tagged assets. CEP provides a rich, declarative environment for developing event processing applications to improve the effectiveness of business operations. CEP can process multiple event streams to detect patterns and trends in real time and provide enterprises the necessary visibility to capitalize on emerging opportunities or mitigate developing risks.

A continuous stream of data (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<time_stamp>, <attribute(s)>), where <attributes> represents the data portion of the schema and can comprise one or more attributes. For example, the schema for a stock ticker event stream may comprise attributes <stock symbol> and <stock price>. Each event received via such a stream will have a time stamp and the two attributes. For example, the stock ticker event stream may receive the following events and associated timestamps:

---

...
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
...

---

In the above stream, for stream element (<timestamp_N+1>, <ORCL,62>), the event is <ORCL,62> with attributes "stock_symbol" and "stock_value." The timestamp associated with the stream element is "timestamp_N+1". A continuous event stream is thus a flow of events, each event having the same series of attributes.

As noted, a stream may be the principle source of data that CQL queries may act on. A stream S may be a bag (also referred to as a "multi-set") of elements (s, T), where "s" is in the schema of S and "T" is in the time domain. Additionally, stream elements may be tuple-timestamp pairs, which can be represented as a sequence of timestamped tuple insertions. In other words, a stream may be a sequence of timestamped tuples. In some cases, there may be more than one tuple with the same timestamp. And, the tuples of an input stream may be requested to arrive at the system in order of increasing timestamps. Alternatively, a relation (also referred to as a "time varying relation," and not to be confused with "relational data," which may include data from a relational database) may be a mapping from the time domain to an unbounded bag of tuples of the schema R. In some examples, a relation may be an unordered, time-varying bag of tuples (i.e., an instantaneous relation). In some cases, at each instance of time, a relation may be a bounded set. It can also be represented as a sequence of timestamped tuples that may include insertions, deletes, and/or updates to capture the changing state of the relation. Similar to streams, a relation may have a fixed schema to which each tuple of the relation may conform. Further, as used herein, a continuous query may generally be capable of processing data of (i.e., queried against) a stream and/or a relation. Additionally, the relation may reference data of the stream.

In some aspects, the CQL engine may include a full blown query language. As such, a user may specify computations in terms of a query. Additionally, the CQL engine may be designed for optimizing memory, utilizing query language features, operator sharing, rich pattern matching, rich language constructs, etc. Additionally, in some examples, the CQL engine may process both historical data and streaming data. For example, a user can set a query to send an alert when California sales hit above a certain target. Thus, in some examples, the alert may be based at least in part on historical sales data as well as incoming live (i.e., real-time) sales data.

In some examples, the CQL engine or other features of the below described concepts may be configured to combine a historical context (i.e., warehouse data) with incoming data in a real-time fashion. Thus, in some cases, the present disclosure may describe the boundary of database stored information and in-flight information. Both the database stored information and the inflight information may include business intelligence (BI) data. As such, the database may, in some examples, be a BI server or it may be any type of database. Further, in some examples, the features of the present disclosure may enable the implementation of the above features without users knowing how to program or otherwise write code. In other words, the features may be provided in a feature-rich user interface (UI) or other manner that allows non-developers to implement the combination of historical data with real-time data.

In some examples, the above concepts may be utilized to leverage the rich real-time and continuous event processing capabilities associated with complex event processing. Several features may be supported such as, but not limited to, archived relations. As such, in order to leverage such features (e.g., rich, real-time and continuous event processing), the system may be configured to transparently deal with startup state and runtime state of relational data. In other words, the system may be configured to manage a query that is non-empty at the instant of its creation (i.e., an archived relation).

In some examples, an archived relation may be utilized. As such, when a CQL engine sees a query that indicates that it is based on an archived relation, that archived relation may also indicate that there are certain entities it can call to query for historical context, for example. In some examples, a data definition language (DDL) may indicate annotations about the archived relation such as, but not limited to, how to perform the query, what are the important columns in the table, and/or where to send the rest of the data. In some examples, once the query is constructed in the CQL engine (e.g., as a graph), the system may analyze the query graph. Additionally, in some aspects, there are certain operators that are stateful, like "distinct," "group aggr," "pattern," and/or "group by." However, stateless operators may just take input and send it to the parent, for example, downstream operators. Thus, one approach is to store the entire table. However, utilizing archived relations, the system may analyze the query graph and decide which of the lowest stateful operators that it can use to query the archive. In some examples, the system (or one or more computer-implemented methods) may retrieve the state at the lowest stateful operator reached while traversing the graph. For example, the query graph may be analyzed in a topological order from the source. Based at least in part on this first stateful operator, the CQL engine may then determine the optimal amount of data to be fetched in order to initialize the state of the operators for a query defined over an archived relation.

In at least one non-limiting example, source operators like relation and/or source may come first in the topological traversal with query output and/or root coming last. For example, if the CQL query looks like: select sum(c1) from R1 where c2>c25, the plan for this query may look like: RelationSource→SELECT→GroupAggr. Thus, following the topological order, and since RelationSource and SELECT are both stateless, the lowest stateful operator may be GroupAggr. In this way, the stateful operators of a query (GroupAggr in this example) may enable the query engine to populate the query engine with historical data from a data store prior to receiving streaming data. This may be enabled based at least in part on the fact that the query is analyzing an archived relation and the archived relation has been indicated as such.

In some examples, a window size for a given archived relation may be specified by a user. A window, in some aspects, in relation to an archived relation, may include a node in a query graph that analyzes or otherwise evaluates incoming streamed content. In other words, the window may define the amount of streamed content to be analyzed and/or processed by the query engine and/or the amount of historical data that will be included in the archived relation.

At a high level, once a window is applied on a Stream it becomes a Relation and then regular relational logic may be applied, as with relational databases. As tuples arrive and leave the window, the Relation under consideration changes with queries compiled against it emitting results at the same time. CQL may support RANGE (up to nanoseconds granularity), ROWS, PARTITION BY and extensible windows. These windows are examples of stream-to-relation operators. On the other hand, ISTREAM (i.e., insert stream), DSTREAM (i.e., delete stream) and RSTREAM (i.e., relation stream) are relation-to-stream operators. In some examples, a user, developer, and/or manager may set the window size (e.g., via a UI) provided by the query engine or one or more computing systems operating or hosting the query engine. In some examples, a window on a stream may be a time-based range window. For example, a configurable value window on an archived relation may be specified using window size and the attribute on which the window is calculated. When there is a configurable value window specified on top of archived relation, a snapshot query may be computed and the snapshot tuples, which are within window limits, may be output. Additionally, after state initialization, the value window may be applied on incoming active data. In some examples, only the incoming active data will be inserted into window whose window attribute's value is differing from current event time for less than the window size.

Additionally, in some examples, features of the present disclosure may also leverage the continuous query processing capabilities of the CQL engine and/or CEP engine to support real-time data analysis. In some aspects, the CQL engine and/or CEP engine may have traditionally been a stream-oriented analysis engine; however, it may be enhanced to support stream-oriented data that is backed by a durable store (e.g., the archived relation described above). For example, the present disclosure describes features that may support the notion of a data object (DO) which is a durable store (database and/or table). Modifications made to a DO may cause change notifications to be broadcast to interested listeners creating, in effect, a data stream. This data stream may be consumed by the CQL engine and/or CEP engine in support of any running queries; however, the CQL engine and/or CEP engine may not have been designed to take into account the existing data in the DO backing store. For example, the CQL engine and/or CEP engine may request that the initial state of the query running in the CQL engine and/or CEP engine reflect the current state of the DO including all the data currently in the DO backing store. Once this query is so initialized, the CQL engine and/or CEP engine only need to concern itself with the stream of DO change notifications from that point on in traditional stream-oriented style.

In some aspects, the CQL engine and/or CEP engine may traditionally process streams or non-archived relations, so there may be no initial state. For example, a query may be loaded, where it may start running and listening for changes, etc. In some cases, if a user asks for sales by state, in a bar chart, and then somebody makes a new sale, the table may get updated and the user may expect to see a change in the graph, pushed out to them. However, if they close the dashboard and come back a week later and bring up some sales, the user may expect to have the sum of sales according to the table of summed sales data. In other words, the query may need to bring the query up to the state of the archive and then listen for active changes.

In some aspects, for example, the CQL engine may be pre-initialized with the archived data. Once initialized, the CQL engine may listen to a Java Messaging Service (JMS) or other messenger for change notifications (e.g., based at least in part on API calls for inserting, deleting, etc., data from the archive). Thus, services can listen and if the JMS publishes on the same topic that the listening service is listening on, it may receive the data. The services don't have to know who is publishing or whether they are, or not. The listening service can just listen, and if something happens, the listening service may hear it. In some examples, this is how persistence is decoupled, for instance, from its consumers. Additionally, in some examples, an alert engine may raise alerts based on what the alert engine hears, potentially, and further, a SQL engine, that may be listening in on process queries of relevance to the listener.

In some examples, a query may be started in CQL, SQL, and/or CEP engine and instructions may be configured to get the archive data (e.g., to prime the pump) and then start listening to these JMS messages. However, with numerous inserts, deletes, etc., this could include a large amount of information. Additionally, there could be a lag time before the message is heard by the listener and the listening may, in some examples, jump in, query the archive, come back, and start listening. Thus, there is a potential for missing and/or double counting an event.

Additionally, if the engine merely runs the query, while it's running the query things can go into JMS and be published where the engine wasn't listening. So, the engine may be configured to setup the listener first, run the archive query, and then come back and actually start pulling out of the queue, so that it doesn't miss anything. Thus, the JMS may queue things up and, if things back up it's okay while the engine is doing a query because it can catch up later and it doesn't have to worry about whether it's synchronous. If it's not here, listening, it won't miss it, it gets queued until the engine comes back, as long as it has its listener established.

Additionally, in some examples, a system column may be added to a user's data. This system column may be for indicating transaction IDs to attempt to handle the double counting and/or missing operation problem. However, in other examples, the system may provide or otherwise generate a transaction context table. Additionally, there may be two additional columns TRANSACTION_CID and TRANSACTION_TID. The context table may always be maintained by persistence service so as to know thread (context)wise of the last committed transaction ID. The transaction IDs may be guaranteed to be committed in ascending order for a thread (context). For example, when a server comes up, it may run the persistence service. Each one may allocate a set of context IDs and transaction IDs for determining whether data of the pre-initialized information includes all of the data that has passed through the JMS. Additionally, in some cases, multiple output servers may be utilized (in compliance with JTA and/or to implement high availability (HA), where each server may manage a single set of context/transaction tables that are completely separate from the other tables managed by the other servers.

In some embodiments, when a continuous (for example, a CQL) query is created or registered, it may undergo parsing and semantic analysis at the end of which a logical query plan is created. When the CQL query is started, for example, by issuing an "alter query <queryname> start" DDL, the logical query plan may be converted to a physical query plan. In one example, the physical query plan may be represented as a directed acyclic graph (DAG) of physical operators. Then, the physical operators may be converted into execution operators to arrive at the final query plan for that CQL query. The incoming events to the CQL engine reach the source operator(s) and eventually move downstream with operators in the way performing their processing on those events and producing appropriate output events.

Event Processing Applications

The quantity and speed of both raw infrastructure and business events is exponentially growing in IT environments. Whether it is streaming stock data for financial services, streaming satellite data for the military or real-time vehicle-location data for transportation and logistics businesses, companies in multiple industries must handle large volumes of complex data in real-time. In addition, the explosion of mobile devices and the ubiquity of high-speed connectivity adds to the explosion of mobile data. At the same time, demand for business process agility and execution has also grown. These two trends have put pressure on organizations to increase their capability to support event-driven architecture patterns of implementation. Real-time event processing requires both the infrastructure and the application development environment to execute on event processing requirements. These requirements often include the need to scale from everyday use cases to extremely high velocities of data and event throughput, potentially with latencies measured in microseconds rather than seconds of response time. In addition, event processing applications must often detect complex patterns in the flow of these events.

The Stream Analytics platform (e.g., the Oracle Stream Analytics (OSA)) targets a wealth of industries and functional areas. The following are some use cases:

Telecommunications: Ability to perform real-time call detail (CDR) record monitoring and distributed denial of service attack detection.

Financial Services: Ability to capitalize on arbitrage opportunities that exist in millisecond or microsecond windows. Ability to perform real-time risk analysis, monitoring and reporting of financial securities trading and calculate foreign exchange prices.

Transportation: Ability to create passenger alerts and detect baggage location in case of flight discrepancies due to local or destination-city weather, ground crew operations, airport security, etc.

Public Sector/Military: Ability to detect dispersed geographical enemy information, abstract it, and decipher high probability of enemy attack. Ability to alert the most appropriate resources to respond to an emergency.

Insurance: Ability to learn and to detect potentially fraudulent claims.

IT Systems: Ability to detect failed applications or servers in real-time and trigger corrective measures.

Supply Chain and Logistics: Ability to track shipments in real-time and detect and report on potential delays in arrival.

Real Time Streaming & Event Processing Analytics

With exploding data from increased number of connected devices, there is an increase in large volumes of dynamically changing data; not only the data moving within organizations, but also outside the firewall. High-velocity data brings high value, especially to volatile business processes. However, some of this data loses its operational value in a short time frame. Big Data allows the luxury of time in processing for actionable insight. Fast Data, on the other hand, requires extracting the maximum value from highly dynamic and strategic data. It requires processing much faster and facilitates taking timely action as close to the generated data as possible. The stream analytics platform delivers on Fast Data with responsiveness. Oracle Edge Analytics pushes processing to the network edge, correlating, filtering and analyzing data for actionable insight in real-time.

The stream analytics platform provides ability to join the incoming streaming events with persisted data, thereby delivering contextually aware filtering, correlation, aggregation and pattern matching. It delivers lightweight, out of the box adapters for common event sources. It also provides an easy-to-use adapter framework for custom adapter development. With this platform, organizations can identify and anticipate opportunities, and threats represented by seemingly unrelated events. Its incremental processing paradigm can process events using a minimum amount of resources providing extreme low latency processing. It also allows it to create extremely timely alerts, and detect missing or delayed events immediately, such as the following:

Correlated events: If event A happens, event B almost always follows within 2 seconds of it.

Missing or Out-of-Sequence events: Events A, B, C should occur in order. C is seen immediately after A, without B.

Causal events: Weight of manufactured items is slowly trending lower or the reading falls outside acceptable norms. This signals a potential problem or future maintenance need.

In addition to real-time event sourcing, the stream analytics platform design environment and runtime execution supports standards-based, continuous query execution across both event streams and persisted data stores like databases and high performance data grids. This enables the platform to act as the heart of intelligence for systems needing answers in microseconds or minutes to discern patterns and trends that would otherwise go unnoticed. Event Processing use cases require the speed of in-memory processing with the mathematical accuracy and reliability of standard database SQL. This platform queries listen to incoming event streams and execute registered queries continuously, in-memory on each event, utilizing advanced, automated algorithms for query optimization. While based on an in-memory execution model, however, this platform leverages standard ANSI SQL syntax for query development, thus ensuring accuracy and extensibility of query construction. This platform is fully compliant with the ANSI SQL '99 standard and was one of the first products available in the industry to support ANSI SQL reviewed extensions to standard SQL for real-time, continuous query pattern matching. The CQL engine optimizes the execution of queries within a processor leaving the developer to focus more on business logic rather than optimization.

The stream analytics platform allows for both SQL and Java code to be combined to deliver robust event processing applications. Leveraging standard industry terminology to describe event sources, processors, and event output or sinks, this platform provides a meta-data driven approach to defining and manipulating events within an application. Its developers use a visual, directed-graph canvas and palette for application design to quickly outline the flow of events and processing across both event and data sources. Developing the flow through drag and drop modeling and configuration wizards, the developer can then enter the appropriate metadata definitions to connect design to implementation. When necessary or preferred, with one click, developers are then able to drop into custom Java code development or use the Spring® framework directly to code advanced concepts into their application.

Event driven applications are frequently characterized by the need to provide low and deterministic latencies while handling extremely high rates of streaming input data. The underpinning of the stream analytics platform is a lightweight Java container based on an OSGi® backplane. It contains mature components from the WebLogic JEE application server, such as security, logging and work management algorithms, but leverages those services in a real-time event-processing environment. An integrated real-time kernel provides unique services to optimize thread and memory management supported by a JMX framework enabling the interaction with the container for performance and configuration. Web 2.0 rich internet applications can communicate with the platform using the HTTP publish and subscribe services, which enables them to subscribe to an application channel and have the events pushed to the client. With a small footprint this platform is a lightweight, Java-based container, that delivers faster time-to-production and lower total cost of ownership.

The stream analytics platform has the ability to handle millions of events per second with microseconds of processing latencies on standard, commodity hardware or optimally with Oracle Exalogic and its portfolio of other Engineered Systems. This is achieved through a complete "top-down" layered solution, not only with a design focus on high performance event processing use cases, but also a tight integration with enterprise-class real-time processing infrastructure components. The platform architecture of performance-oriented server clusters focuses on reliability, fault tolerance and extreme flexibility with tight integration into the Oracle Coherence technology and enables the enterprise to predictably scale mission-critical applications across a data grid, ensuring continuous data availability and transactional integrity.

In addition, this platform allows for deterministic processing, meaning the same events can be fed into multiple servers or the same server at different rates achieving the same results each time. This enables incredible advantages over systems that only rely on the system clock of the running server.

Stream Analytics Architecture

Embodiments of the present disclosure provide techniques for receiving and processing data form a source. There are two kinds of sources in stream analytics: streams and references. Though sources serve as an input to a pipeline, the two types of source are different. A stream is a representation of streaming event data while a reference is that of static data. Streaming event data is flowing into the system and is to be processed, whereas static data is used to enrich streaming event data by pulling the static data from a static data source. The initial or primary source of a pipeline is typically a stream of event data. However, additional sources can be both streams and/or references.

In various embodiments, stream analytics is an event processing server designed to support event processing applications in embedded environments such as those supported by the Java Embedded Suite (JES). The stream analytics system comprises a stream analytics server, stream analytics Visualizer, a command-line administrative interface, and an Integrated Development Environment (IDE). The stream analytics server hosts logically related resources and services for running stream analytics applications. Servers may be grouped into and managed as domains. A domain can have one server (standalone-server domain) or many (multiserver domain). The stream analytics' domains and servers may be managed through the stream analytics visualizer and the command-line administrative interface. In some embodiments, the stream analytics visualizer is a web-based user interface through which stream analytics applications running on the stream analytics server are deployed, configured, tested, and monitored. In some embodiments, the command-line administrative interface enables a user to manage the server from the command line and through configuration files. For example, the user may start and stop domains and deploy, suspend, resume, and uninstall an applications. Advantageously, the stream analytics system is developed to simplify the complex event processing operations and make them available even to users without any technical background.

A stream analytics application receives and processes data streaming from an event source. A stream is a source of dynamic data. The data is flowing, it is not static or frozen. For example, stock prices of a particular company can be considered as a stream as the data arrives in every second or even more frequently. Another example of streaming data is the position (geographical location) of vehicles (e.g., trucks) which again can change continuously as each vehicle is moving. Each vehicle reports its own position to a central system periodically, e.g. every second, and the central system receives the position messages as a stream. Streams may be transmitted using different network protocols, messaging systems as well as using many different message formats. For example, the stream types may include Kafka and GoldenGate. To create a Kafka stream, a user may create a Kafka connection first, and then select that connection in a stream creation wizard. In addition to the connection, the user may specify the Kafka topic that represents the stream of data. When the stream is created, the shape or format of the data is specified. In stream analytics, each message (or event, in stream processing terminology) in a stream or target should have the same format and this format may be specified when creating the stream or target. The shape or format of the event is analogous to the database table structure for static data. Each shape consists of a number of fields and each field has a name and a data type. In the stream creation wizard, it may be possible to assign an alias to a field, so that the field can later be referenced by the user-given alias.

While monitoring the data, the stream analytics application might identify and respond to patterns, look for events that meet specified criteria and alert other applications, or do other work that requires immediate action based on quickly changing data. The stream analytics system uses an event-driven architecture where an application is broken into a set of stages (nodes) connected by queues. Each application may include one or more pipelines that define the pipeline logic and is a sequence of data processing stages connected by the queues. A pipeline typically starts with a stream and can optionally end with a target. A target represents an external system where the results of the stream processing are being directed. Just like streams, targets are the links to the outside world. Streams are the input to a pipeline, whereas targets are the output. In various embodiments, a pipeline may consume and process multiple streams, with a single target. In some embodiments, the output stream of one stage is used as an input to another stage and a pipeline can be of arbitrary length with any combination of above stage types. A user can edit/update configuration on any stage, not limited to last stage (the stage before the target) in a draft pipeline.

In stream analytics, the channel component represents the queues while all of the other components represent stages. Every component in the data processing system, e.g., an event processing network (EPN), has a role in processing the data. The data processing system is the primary point where application components are wired together. In various embodiments, using a CEP integrated development environment (IDE), a user can use an EPN Editor and visualizer that provides a graphical view of the EPN and offers visualization and navigation features to help the user build CEP applications. In some embodiments, the EPN is linear with data entering the EPN through an adapter where it is converted to an event. After the conversion, events pass through the stages from one end to the other. At various stages in the EPN, the component can execute logic or create connections with external components as needed. Using Oracle CEP IDE for Eclipse, you can use an EPN Editor that provides a graphical view of the EPN and offers visualization and navigation features to help a user build applications.

In various embodiments, the EPN editor is used to configure the various stages of a pipeline with an application. A stage may be one of the following types: Query, Pattern, Rule, Query Group. A query stage is used to configure a SQL-like query on the data stream and comprises additional sources for joins, filters, summaries, group by, time windows, and so on. For example, the following query may be configured using the EPN editor to calculate hourly total sales where transaction amount is greater than a dollar and outputs the result every 1 second.

```
Select sum (TransactionAmount) As HourlySales
From SalesStream [Range 1 Hour Slide 1 Second]
Where TransactionAmount > 1
```

Queries like the above or more complex queries may be configured in the query stage with zero to little coding and with no intimate knowledge of CQL. The CQL language is similar to SQL but with additional constructs for temporal analytics and pattern matching.

A query stage may include the following subsections: (1) filter, (ii) correlation, (iii) summary/group by, (iv) range, and (v) evaluation frequency. The filter section in a query stage or query group stage allows events in the data stream to be filtered out. For example, only events which satisfy the filter condition are passed to the downstream stage. For example, in a data stream containing SensorId and Temperature, you can filter events where Temperature is lower than or equal to 70 degrees by setting the filter condition to Temperature>70. The correlation section in a query stage or query group stage is used to enrich the incoming event in the data stream with static data from a reference such as a database table or with data from other streams. For example, if the event in the data stream only includes SensorId and Sensor Temperature, the event could be enriched with data from a table to obtain SensorMake, SensorLocation, SensorThreshold, and many more. Correlating an event with other sources may be accomplished with a join condition based on a common key. In the above example, the SensorId from the stream can be used to correlate with SensorKey in the database table.

The summary section in a query stage or query group stage is used to summarize the data over any time range including an unbounded range. Summaries may be defined using one or more aggregate functions including, for example, MIN, MAX, AVG, SUM, and COUNT. For example, a user can continuously compute the maximum temperature for each sensor from the beginning of time by configuring a query like the following query.

```
Select SesnsorId, max(Temperature)
From TemperatureStream
Group By SensorId
```

The group by section in a query stage or query group stage collects the data of all the rows with an identical column value. Group by is used in conjunction with Summaries (aggregate functions) to provide information about each group. Follows is an example configuration that generates a query for computing the average temperature of each sensor at the end of the hour and using readings from last one hour.

```
Select SesnsorId, avg(Temperature)
From TemperatureStream [Range 1 Hour Slide 1 Hour]
Group By SensorId
```

The range section in a query stage or query group stage is used to create a window applied on the data stream. Since data stream is an unbounded sequence of events it is often necessary to apply a window when computing aggregates. Examples of ranges include—Last 1 Hour of events, Last 5 Minutes of events, Last 10 Events, and many more. The evaluation frequency or window slide section in a query stage or query group stage is used to determine how often a user may want to see the results. In the above query, if result is only desired at the end of the hour then the user may set the Evaluation Frequency to 1 hour.

A rule stage is a stage in the pipeline where a user may apply conditional (IF-THEN) logic to the events in the stream. A user may check for specific conditions and assign values to fields based on the results of your checks. A user may add multiple rules to the stage and they will get applied to pipeline in the sequence they are added. A pattern stage allows the user to specify a one or more key fields to discover an interesting result. For example, a user may create pattern stages within the pipeline to discover trends within the event data. A query group stage allows a user to configure aggregations on multiple group bys and multiple windows. It is a collection of groups, where each of the group has its own window, filters that affect the data processing only within that group.

FIG. 1 is a graphical representation of a data processing system such as an EPN that may incorporate an embodiment of the present disclosure. As illustrated in FIG. 1, the EPN 100 may be made up of several stages that each serve a distinct role in the processing of events in an event stream. Events are by definition time-based, so a stream is that sense the natural condition of events. It is how event data arrives at an event processing application. To process events with event processing, an application is built whose core is an EPN such as EPN 100. The EPN 100 is made up of stages that each serve a distinct role in processing events, from receiving event data to querying the data to executing logic based on what is discovered about the events. The application receives raw event data, binds the data to event types, then routes the events from stage to stage for processing. Connected stages in an EPN provide a way to execute different kinds of code against events passing through the EPN. Kinds of stages can include an adapter, a processor, and a bean. More specifically, in various embodiments, the EPN 100 includes event sources 105 that receive events, channels 110 that connect stages, an event processing service (EPS) 115 (also referred to as CQ Service) that is configured to provide an environment for processing event streams, and/or sinks 120 that perform general processing logic.

In some embodiments, event sources 105 include, without limitation, an adapter (e.g., JMS, HTTP, and file), a channel, a processor, a table, a cache, and the like. For example the event source 105 may include one or more adapters. The one or more adapters may interface directly to an input and output stream and relation sources and sinks. The one or more adapters may be configured to understand the input and output stream protocol, and are responsible for converting the event data into a normalized form that can be queried by an application processor. For example, an adapter could receive event data and bind it to an event type instance, then pass the event along to EPS 115. The one or more adapters may be defined for a variety of data sources and sinks. The channels 110 act as event processing endpoints. Among other things, the channels 110 are responsible for queuing event data until an event processing agent can act upon the event data. The EPS 115 may comprise event processing agents configured to perform one or more actions upon the event data such as the execution of queries on the event data.

The event sources 105 generate event streams that are received by EPS 115. EPS 115 may receive one or more event streams from one or more event sources 105. For example, as shown in FIG. 1, EPS 115 receives a first input event stream 125 from event source 105(a), a second input event stream 130 from event source 105(b), and a third event stream 135 from event source 105(c). One or more event processing applications (140, 145, and 150) may be deployed on and executed by EPS 115. An event processing application executed by EPS 115 may be configured to listen to one or more input event streams, process the events received via the one or more event streams based upon processing logic that selects one or more events from the input event streams as notable events. The notable events may then be sent to one or more event sinks 120 in the form of one or more output event streams. For example, in FIG. 1, EPS 115 outputs a first output event stream 155 to event sink 120(a), and a second output event stream 160 to event sink 120(b). Examples of event sinks include, without limitation, an adapter (e.g., JMS, HTTP, and file), a channel, a processor, a cache, and the like. In certain embodiments, event sources, event processing applications, and event sinks are decoupled from each other such that one can add or remove any of these components without causing changes to the other components.

In some embodiments, EPS 115 may be implemented as a Java server comprising a lightweight Java application container, such as one based upon Equinox OSGi, with shared services. In some embodiments, EPS 115 may support ultra-high throughput and microsecond latency for processing events, for example, by using JRockit Real Time. EPS 115 may also provide a development platform (e.g., a complete real time end-to-end Java Event-Driven Architecture (EDA) development platform) including tools (e.g., CEP Visualizer and CEP IDE) for developing event processing applications. An event processing application is configured to listen to one or more input event streams, execute logic (e.g., a query) for selecting one or more notable events from the one or more input event streams, and output the selected notable events to one or more event sources via one or more output event streams.

FIG. 1 provides a drilldown for one such event processing application 145. As shown in FIG. 1, event processing application 145 is configured to listen to input event stream 130, execute a continuous query using CQL processor 165 comprising logic for selecting one or more notable events from input event stream 130, and output the selected notable events via output event stream 160 to event sink 120(b). Although event processing application 145 is shown as listening to one input stream and outputting selected events via one output stream, this is not intended to be limiting. In alternative embodiments, an event processing application may be configured to listen to multiple input streams received from one or more event sources, select events from the monitored streams, and output the selected events via one or more output event streams to one or more event sinks. The same query can be associated with more than one event sink and with different types of event sinks.

Due to its unbounded nature, the amount of data that is received via an event stream is generally very large. Consequently, it is generally impractical and undesirable to store or archive all the data for querying purposes. The processing of event streams requires processing of the events in real time as the events are received by EPS 115 without having to store all the received events data. EPS 115 therefore provides a special querying mechanism that enables processing of events to be performed as the events are received by EPS 115 without having to store all the received events. In particular, event-driven applications of EPS 115 are typically rule-driven and these rules may be expressed in the form of continuous queries that are used to process input streams. A continuous query may comprise instructions (e.g., business logic) that identify the processing to be performed for received events including what events are to be selected as notable events and output as results of the query processing. Continuous queries may be persisted to a data store and used for processing input streams of events and generating output streams of events. Continuous queries typically perform filtering and aggregation functions to discover and extract notable events from the input event streams. As a result, the number of outbound events in an output event stream is generally much lower than the number of events in the input event stream from which the events are selected.

Unlike a SQL query that is run once on a finite data set, a continuous query that has been registered by an application with EPS 115 for a particular event stream may be executed each time that an event is received (or if a slide is used each window) in that event stream. As part of the continuous query execution, EPS 115 evaluates the received event based upon instructions specified by the continuous query to determine whether one or more events are to be selected as notable events, and output as a result of the continuous query execution. The continuous query may be programmed using different languages. In certain embodiments, continuous queries may be configured using the CQL provided by Oracle Corporation and used by Oracle's Complex Events Processing product offerings. Oracle's CQL is a declarative language that can be used to program queries (referred to as CQL queries) that can be executed against event streams. In certain embodiments, CQL is based upon SQL with added constructs that support processing of streaming events data.

In various embodiments, an event processing application may be composed of the following component types: (i) one or more adapters 170 that interface directly to the input and output stream and relation sources and sinks; (ii) one or more channels 110 that act as event processing endpoints; (iii) one or more application processors 175 (or event processing agents) configured to consume normalized event data from a channel, process it using queries to select notable events, and forward (or copy) the selected notable events to an output channel; (iv) one or more beans 180 configured to listen to the output channel, and are triggered by the insertion of a new event into the output channel; and (v) one or more event beans 185 registered to listen to the output channel, and are triggered by the insertion of a new event into the output channel. In certain embodiments, an assembly file may be provided for an event processing application describing the various components of the event processing application, how the components are connected together, event types processed by the application. Separate files may be provided for specifying the continuous query or business logic for selection of events.

The adapters 170 may configured to understand the input and output stream protocol, and are responsible for converting the event data into a normalized form that can be queried by an application processor. The adapters 170 may forward the normalized event data into channels or output streams and relation sinks. Event adapters may be defined for a variety of data sources and sinks. The processors 175 may comprise a CQL processor that contains query code in CQL that may be associated with one or more CQL queries that operate on the events offered by an input channel (e.g., a channel 110). For example, the processor's CQL code can query the events (as SQL code queries database rows), looking for particular patterns in the data as it flows through the EPN 100. The CQL processor may be connected to an output channel (e.g., a channel 110) to which query results are written. For example, events that meet the pattern criteria could be passed along to a bean 180 (e.g., written in Java) or code, where the data could be used in a calculation with data retrieved from an external source. A further downstream bean 185 or code could use the calculation result to execute a process using an external component. The beans 185 or code may be registered to listen to the output channel 110, and are triggered by the insertion of a new event into the output channel 110. In some embodiments, the processing logic for the beans 180/185 may be written in a programming language such as Java or a plain-old-Java-object (POJO). In some embodiments, the processing logic may use the CEP event bean API so that the beans 180/185 can be managed by CEP. Any component designed to receive or send events in the EPN 100 (such as EPN stages) may be been implemented specifically to do so. Components that are able to receive events are known as the event sinks 120, while components that send events are known as the event sources 105. A single component could be both an event source and a sink. The described stage components included in event processing, such as adapters and the components on which CQL processors are based, already support required functionality. Developers can add event sink and source support to beans, new adapters, and other code they write by implementing interfaces from the CEP API.

It should be appreciated that system 100 depicted in FIG. 1 may have other components than those depicted in FIG. 1. Further, the embodiment shown in FIG. 1 is only one example of a system that may incorporate an embodiment of the present disclosure. In some other embodiments, system 100 may have more or fewer components than shown in FIG. 1, may combine two or more components, or may have a different configuration or arrangement of components. System 100 can be of various types including a service provider computer, a personal computer, a portable device (e.g., a mobile telephone or device), a workstation, a network computer, a mainframe, a kiosk, a server, or any other data processing system. In some other embodiments, system 100 may be configured as a distributed system where one or more components of system 100 are distributed across one or more networks in the cloud.

The one or more of the components depicted in FIG. 1 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Logical Queries in a Distributed Stream Processing System

Computations on data streams can be challenging due to multiple reasons, including the size of a dataset. Certain metrics such as quantiles need to iterate over the entire dataset in a sorted order using standard functions/practices, but standard functions/practices may not be the most suited approach, for example, mean=sum of value/count. For a streaming dataset with multiple attributes, this is not fully scalable. Instead, suppose the SUM and COUNT are stored and each new item is added to the SUM. For every new item, the COUNT is incremented, and whenever an AVG is needed, the SUM is divided by the COUNT to obtain the AVG at that instance. These are known as aggregate functions and are powerful SQL tools that compute numerical calculations on streaming data, allowing a query to return summarized information about a given column or result set.

A GROUP BY statement is often used with aggregate functions (COUNT, MAX, MIN, SUM, AVG) to group the result-set by one or more columns or rows. The GROUP BY statement applies to all aggregate functions in a summary clause. Accordingly, if a user wants to use two or more different GROUP BY statements to aggregate the result-set into different buckets, then this is not conventionally possible in a single summary or query stage and a user has to use multiple summary or query stages (e.g., sub queries) and include a join function to combine the results of the multiple summary or query stages. Take for example a working bus advertisement demo that: (1) receives an input shape of an event for the data set that contains the following attributes: a time stamp, ad ID, location displayed, time of day, ad category and revenue per impression; (2) inputs the data set into a continuous query (the query comprising two stages: i) Count All Advertisement by Ad Category; and ii) Sum Revenue Impressions of all advertisements For Every Time Of Day (i.e., Total Ad Revenue from advertisements displayed in morning), which is essentially two aggregate functions based on two different criteria or attributes; and (3) outputs an output shape of an event for the data set that contains the following attributes: time stamp, total ad count by category, ad category, total revenue by time of day, and time of day, as shown in below in the below Example (1).

Example (1)

Input Stream:

| Timestamp | AD_ID | LocationDisplayed | TimeOfDay | AD_Category | Revenue_Per_Impression |
|---|---|---|---|---|---|
| 1 | 1001 | Market St, San Francisco | Morning | Gifts | 0.65 |
| 2 | 1002 | Mission St, San Francisco | Evening | Health | 0.77 |
| 3 | 1003 | Financial District, San Francisco | Morning | Stationary | 0.89 |
| 4 | 1004 | Pier 39, San Francisco | Evening | Gifts | 0.77 |

Expected Output Stream:

| Timestamp | Total_AD_Count_By_Category | AD_Category | Total_Revenue_By_TimeOfDay | Time_Of_Day |
|---|---|---|---|---|
| 1 | 1 | Gifts | 0.65 | Morning |
| 2 | 1 | Health | 0.77 | Evening |
| 3 | 1 | Stationary | 1.54 | Morning |
| 4 | 2 | Gifts | 1.54 | Evening |

In this instance, since two different GROUP BY statements are included in the query (i.e., COUNT summary is based on group defined by "Ad_Category" and SUM summary is based on group defined by "TimeOfDay"), a user would need to set up two different query stages in the pipeline with each query stage processing a query for each GROUP BY. A join function would also need to be included to combine the results of each query to obtain the above output shape. However, this is inefficient and users would like to compute multiple aggregate functions in a single query stage without having to worry about creating multiple aggregate functions in parallel on multiple query stages and then joining the results back into a single output shape.

Logical Syntax Query

To address the above problem, various embodiments are directed to a technique for introducing a new syntax (logical syntax) and semantics for aggregate functions and associate them with logical CQL.

For example, a conventional query plan may include two summaries (COUNT and SUM) expressed with physical syntax in two different query stages (tksummarygroupl_v3 and tksummarygroupl_v4) as shown in Example (2).

Example (2)

```
CREATE VIEW tksummarygroupl_v3 AS ISTREAM
    (SELECT COUNT (ad_id)      AS totalads_by_ad_category,
        ad_category            AS ad_category
    FROM tksummarygroupl_S1 [RANGE 5 seconds]
    GROUP BY ad_category
    )
CREATE VIEW tksummarygroupl_v4 AS ISTREAM
    (SELECT SUM (revenue)      AS sumrevenue_by_timeofday,
        time_of_day            AS time_of_day
    FROM tksummarygroupl_S1 [RANGE 5 seconds]
    GROUP BY time_of_day
    )
CREATE query tksummarygroupl_q2 AS ISTREAM
    (SELECT R1.totalads_by_ad_category   AS totalads_by_ad_category,
        R1.ad_category                   AS ad_category,
        R2.sumrevenue_by_timeofday       AS sumrevenue_by_timeofday,
        R2.time_of_day                   AS time_of_day
    FROM tksummarygroupl_v3 [NOW]        AS R1
    LEFT OUTER JOIN tksummarygroupl_v4 [NOW] AS R2
    ON R1.ELEMENT_TIME = R2.ELEMENT_TIME
    UNION
    SELECT R1.totalads_by_ad_category    AS totalads_by_ad_category,
        R1.ad_category                   AS ad_category,
        R2.sumrevenue_by_timeofday       AS sumrevenue_by_timeofday,
        R2.time_of_day                   AS time_of_day
    FROM tksummarygroupl_v3 [NOW]        AS R1
    RIGHT OUTER JOIN tksummarygroupl_v4 [NOW] AS R2
    ON R1.ELEMENT_TIME = R2.ELEMENT_TIME
    )
```

To compute this query plan with physical CQL a view is expressed for each query stage and the output of each view is then joined to generate the final output shape of events.

In various embodiments, a logical syntax is used to convert a conventional query plan with physical CQL queries for multiple summaries executed respectively in multiple query stages into a query plan with logical CQL queries for multiple summaries executed in a single query stage. In other embodiments, a creation application is used to create a query plan with logical CQL queries for multiple summaries executed in a single query stage using logical syntax. The logical syntax of aggregate functions (or summary) in summary groups may look like the following:

```
function_identifier ( [DISTINCT] arith_expr [BY group_by_attrs ]
[WITHIN window_spec ] [ WHERE condition ]);
```

Note:
Entries in the square brackets are optional syntax.

For example, the logical syntax for the conventional query plan shown in Example (2) would be as follows:

```
SELECT COUNT(AD_ID BY AD_Category) AS
    Total_AD_Count_By_Category,
    SUM(Revenue_Per_Impression BY TimeOfDay) AS
    Total_Revenue_By_TimeOfDay FROM BUS_STREAM.
```

In the logical syntax, the window, the filter, and the grouping criteria are associated with each aggregate function. In other words, every summary can have its own grouping criteria, filter, and window in the same query stage. The semantics of the various sub-clauses used in the logical syntax include:
  i. function_identifier: Name of Summary (Aggregate Function) such as COUNT or SUM. This should be a valid CQL aggregate function.
  ii. arith_expr: Arithmetic expression whose values are being aggregated such as AD_ID or Revenue_Per_Impression.
  iii. group_by_attrs: List of Group By Attributes such as BY AD_Category or BY TimeOfDay.
  iv. window_spec: Window Specification such as WITHIN. Window can be RANGE WINDOW, ROW WINDOW, VALUE WINDOW with or without Slide specification.
  v. condition: A Simple or Complex Filter Condition such as WHERE.

By way of further example, the various sub-clauses may also come together as follows:
COUNT(AD_ID BY AD_Category WITHIN 5 MINUTES)—This function will count all AD_IDs per AD_Category in a window of the Last 5 minutes.
AVG(Revenue_Per_Impression BY TimeOfDay WHERE LocationDisplayed like "% Market St, San Francisco %")—This function will count average revenue of all Advertisements for every time of day based on the display location filter of Market St, San Francisco.

This solution is an improvement over prior industry solutions that utilize GROUP BY statements with aggregate functions. Conventionally this is not possible in a single summary or query stage (i.e., in the user interface of typical databases include a GROUP BY selection that applies to all summaries within the query stage and a user cannot add a different GROUP BY for a particular summary). Instead, a user has to rely on multiple query stages, which involves join functions. For example, some databases permit two or more different GROUP BY statements to be used in different sub queries. However, these databases utilize complex and compute-intensive join functions with the sub queries to obtain the output shape with the expected output data. The logical syntax disclosed in various embodiments herein eliminates the need of a complex and compute-intensive join stage as used in previous continuous queries.

Figure 2A:
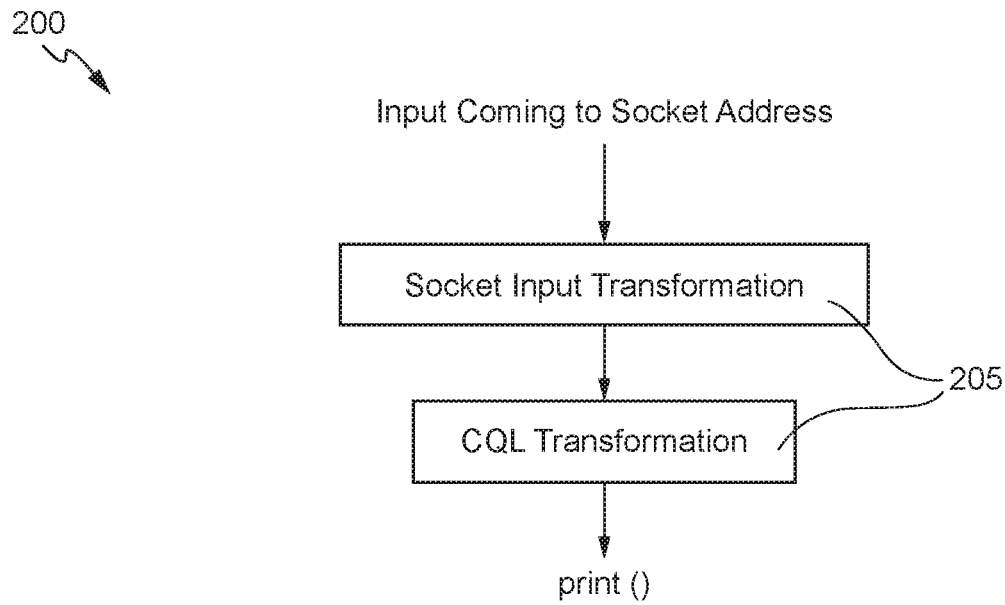
FIGS. 2A-2D are illustrations of directed acyclic graphs (DAGs) in accordance with various embodiments.

Transforming and Processing Complex Logical Continuous Queries Using a Dag of Executable Transformations Typically a query plan is executed in a data processing system across a distributed cluster of nodes where various query stages may be processed on a number of nodes. However, this type of cluster system can be a problem for a query plan with logical CQL queries where a single query stage may comprise multiple summaries based on different groups. For example, a typical stream analytics application having a query plan with a physical CQL query may be represented as a directed acyclic graph (DAG) of physical operators or executable transformations. Every stage (e.g., query or pattern stage) in the DAG receives one or more input streams and transforms the one or more input streams into an output stream as per the stage's implementation. The output steams may then be joined into an output shape of events. In some stream analytics applications, in order to run a physical CQL query in a distributed cluster (e.g., distributed nodes of a cluster), a stage is created in the application for a CQL based transformation such as a summary. For example, in the following stream analytics application:

```
val inputStream = AppContext.socketTextStream("localhost", 9999)
val cqlOutput = AppContext.cql("select count(*) from input",......)
cqlOutput.print( )
``` two transformations are defined. The first is a socket text transformation and the second is a CQL transformation. Accordingly, this application could be represented as a DAG 200 of executable transformations 205, as shown in FIG. 2A.

In the above approach, the CQL transformation is executing a continuous query (stateful or stateless). In particular, the CQL transformation stage receives a stream of events and processes the events through a query plan for a continuous query. The query plan for each physical CQL transformation stage is typically simple and does not include complex relational operations such as two or more different GROUP BY statements to aggregate the result-set into different buckets, and/or two or more window or condition statements to apply multiple windows and conditions to the aggregate functions. The problem is that for query plans that are more complex (e.g., those that use the newly proposed logical syntax/semantics to include two or more different GROUP BY statements to aggregate the result-set into different buckets), the DAG created by the cluster for the CQL transformation stage is insufficient to handle the complex query plan.

The proposed solution is to determine a DAG of executable transformations from the logical CQL query, which can be executed on a cluster of distributed nodes. Specifically, various embodiments provide techniques that include the following steps: (1) Convert a logical CQL query to one or more physical CQL queries, and (2) generate a DAG of the one or more physical CQL queries.

As discussed herein, CQL supports two sets of syntax (logical and physical syntax). Logical syntax is easier to understand and concise for creating a logical CQL query;

however, logical syntax cannot be translated into an executable query plan represented as a DAG of physical operators. Consequently, prior to creating the query plan, the logical CQL query needs to be transformed using physical syntax into one or more physical CQL queries. Example (3) illustrates this step for converting an existing logical CQL syntax based query to multiple physical CQL syntax based queries.

Example (3)

Logical Query:

```
SELECT COUNT(AD_ID BY AD_Category) AS Total_AD_Count_By_Category,
       SUM(Revenue_Per_Impression BY TimeOfDay) AS
       Total_Revenue_By_TimeOfDay FROM BUS_STREAM.
Converted to the Physical query:
   CREATE VIEW tksummarygroupl_v3 AS ISTREAM
       (SELECT COUNT (ad_id)       AS totalads_by_ad_category,
           ad_category             AS ad_category
        FROM tksummarygroupl_S1 [RANGE 5 seconds]
        GROUP BY ad_category
       )
   CREATE VIEW tksummarygroupl_v4 AS ISTREAM
       (SELECT SUM (revenue)       AS sumrevenue_by_timeofday,
           time_of_day             AS time_of_day
        FROM tksummarygroupl_S1 [RANGE 5 seconds]
        GROUP BY time_of_day
       )
   CREATE query tksummarygroupl_q2 AS ISTREAM
       (SELECT R1.totalads_by_ad_category   AS totalads_by_ad_category,
           R1.ad_category                   AS ad_category,
           R2.sumrevenue_by_timeofday       AS sumrevenue_by_timeofday,
           R2.time_of_day                   AS time_of_day
        FROM tksummarygroupl_v3 [NOW]       AS R1
        LEFT OUTER JOIN tksummarygroupl_v4 [NOW] AS R2
        ON R1.ELEMENT_TIME = R2.ELEMENT_TIME
        UNION
        SELECT R1.totalads_by_ad_category   AS totalads_by_ad_category,
           R1.ad_category                   AS ad_category,
           R2.sumrevenue_by_timeofday       AS sumrevenue_by_timeofday,
           R2.time_of_day                   AS time_of_day
        FROM tksummarygroupl_v3 [NOW]       AS R1
        RIGHT OUTER JOIN tksummarygroupl_v4 [NOW] AS R2
        ON R1.ELEMENT_TIME = R2.ELEMENT_TIME
       )
```

As illustrated in Example (3), a single complex logical continuous query having multiple summaries based on different groups may be converted into three physical continuous queries (each with a summary based on a single group). In various embodiments, a conversion component is added to the stream analytics application for implementing the conversion of the logical query to one or more physical queries. In some embodiments, the conversion component is configured to determine whether a query is expressed as a logical CQL query or a physical CQL query. In certain embodiments, this determination is made based on the syntax used to define the query. As used herein, when an action is "triggered by" or "based on" something, this means the action is triggered or based at least in part on at least a part of the something. In some embodiments, upon determining that the query is expressed as a logical CQL query, the conversion component is further configured to parse the logical CQL query into multiple portions, for example, one portion for each function, and translate the various portions into separate queries, for example, a separate query stage for each function, to generate less complex physical CQL queries for the logical CQL query.

Figure 2B:
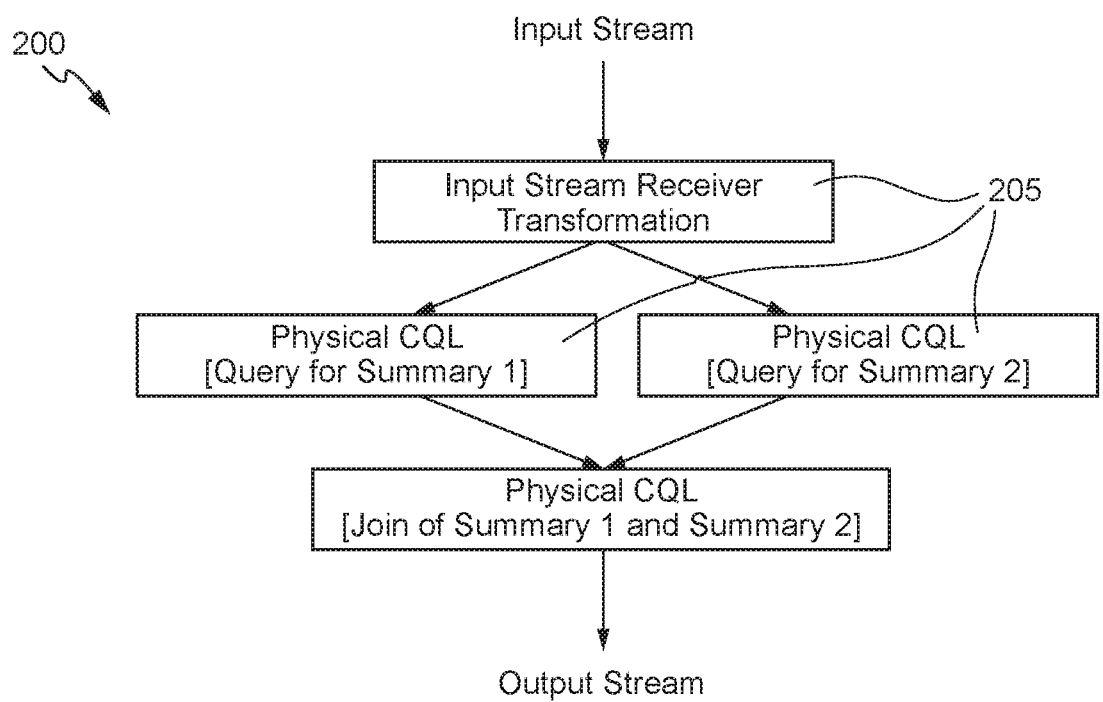

Once the logical CQL query is converted to the multiple physical CQL queries, a DAG of executable transformations may be created comprising transformation 205 for each query stage corresponding to a summary (aggregate function) view (e.g., each physical CQL query), as shown in FIG. 2B. Each of these stages will receive the same input stream and compute the summary individually. The computation of each stage can be further optimized and will be described in next section. After computing all summaries in parallel, the results may be joined back in another transformation stage 215. Along with joining, this additional stage 215 may be used to ensure timestamp progression in an instance where there is no output from either side of the summary inputs.

This solution is an improvement over prior industry solutions that utilize GROUP BY statements with aggregate functions. Currently this is not possible in a single CQL transformation stage. Instead, a user has to rely on multiple CQL transformation stages, which involves join functions. For example, some databases permit two or more different GROUP BY statements to be used in different sub queries. Each of the sub queries is run as a CQL transformation on its own stage, and thus is simple and a DAG can be created by the cluster for each CQL transformation on its own stage.

Executing a Dag of Transformations on a Cluster of Distributed Nodes

Once the DAG of executable transformations are created for each query stage, the transformations may be executed and used to compute the transformations on a cluster of distributed nodes. However, while computing the DAG of executable transformations on the cluster of distributed nodes, the input stream may be received in partitions (e.g., the streaming data may be divided into small micro-batches, for example, for load balancing purposes, that allows for fine-grained allocation of computations to resources) and the processing resources cannot share state. For example, if a query plan is executed as a DAG of executable transformations comprising a COUNT transformation of an attribute such as busID on multiple nodes of the cluster and a first partition of the input data is sent to a first node and second partition of input data is sent to a second node, then the output of the query plan includes multiple partial counts (e.g., one count for each partition of data), and there is conventionally no way to share state or join the partial counts across nodes. Thus, the problem is how to execute the DAG of executable transformations on the cluster of distributed nodes using partitioned input data without losing state such that partial counts are not generated.

The proposed solution is to repartition the data from the input stream based on a parallelism constraint such that each continuous query can be computed on a same node or set of nodes. Specifically, various embodiments provide techniques that include the following steps: (1) analyze the query plan and identify each query stage or each physical CQL query within the query plan; (2) determine whether parallelism is exhibited for each query stage or each physical CQL query; (3) determine whether the input stream should be repartitioned or not based on whether parallelism is exhibited (if parallelism, then no need to reparation to maintain state; but if no parallelism, then need to repartition the input data to avoid losing state); and (4) when there is no parallelism, create a partitioning transformation for the DAG of executable transformations for each query stage or each physical CQL query. This partitioning transformation is included in the DAG of executable transformations created by the cluster.

In some embodiments, the analyzing the query plan includes parsing the query plan and determining each query stage or each physical CQL query that is included within the query plan. In some embodiments, the determining whether parallelism is exhibited for each identified query stage or physical CQL query includes a determination of whether the function or transformation can be processed in parallel on multiple nodes without sharing state. For example, a sequential function such as COUNT could not be processed in parallel on multiple nodes without sharing state, and thus a query stage or physical CQL query that includes the COUNT function or transformation would be determined to exhibit no parallelism. In some embodiments, determining whether the input stream should be repartitioned or not includes: (i) determining the input stream should not be repartitioned when parallelism is exhibited for the query stage or the physical CQL query, and (ii) determining the input stream should be repartitioned when parallelism is not exhibited for the query stage or the physical CQL query.

In some embodiments, the creating the partitioning transformation for the DAG of executable transformations includes determining a partitioning criteria for the query stage or the physical CQL query. The partitioning criteria may be an attribute of the syntax. In some embodiments, the partitioning criteria may be the attribute of the syntax that is acted upon or part of the function or transformation that causes the query stage or physical CQL query to not exhibited parallelism. For example, in the following physical query:

```
CREATE VIEW tksummarygroupl_v3 AS ISTREAM
    (SELECT COUNT (ad_id)      AS totalads_by_ad_category,
        ad_category            AS ad_category
    FROM tksummarygroupl_S1 [RANGE 5 seconds]
    GROUP BY ad_category
```

Figure 2C:
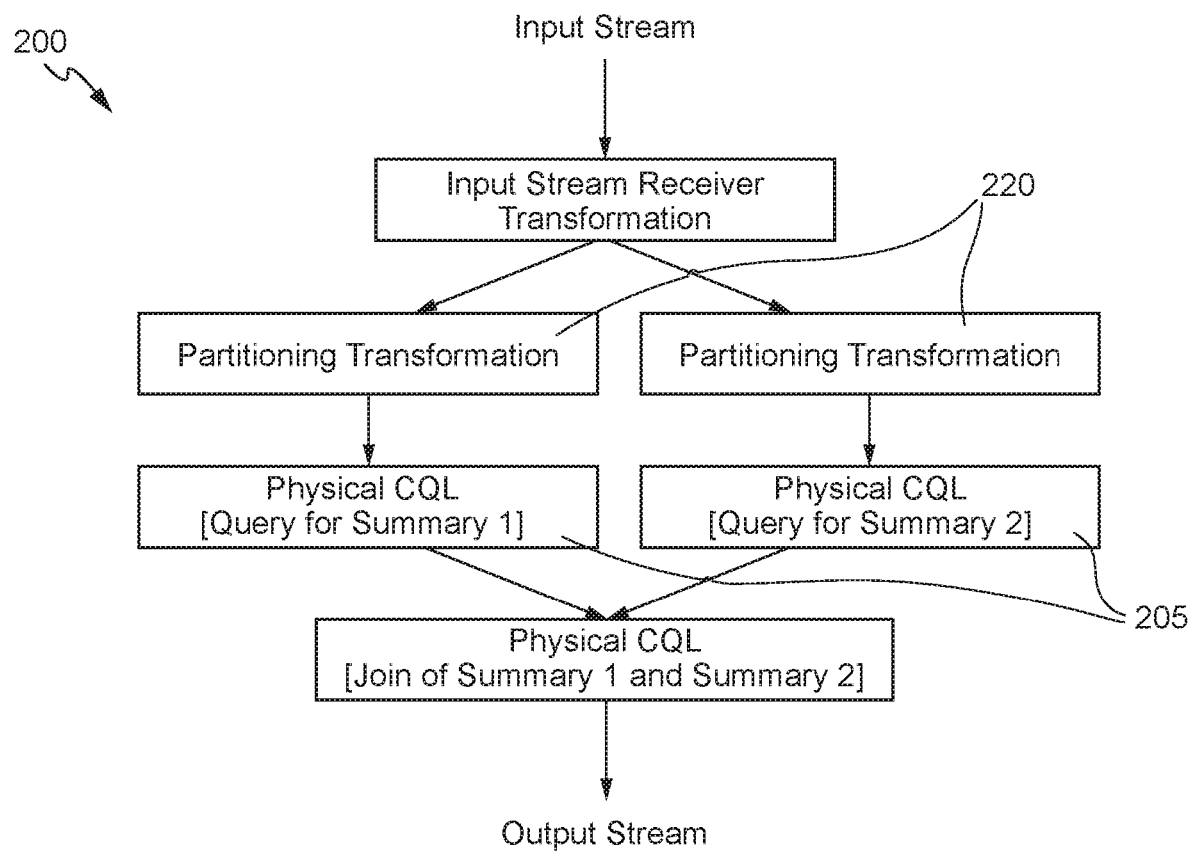
Figure 2D:
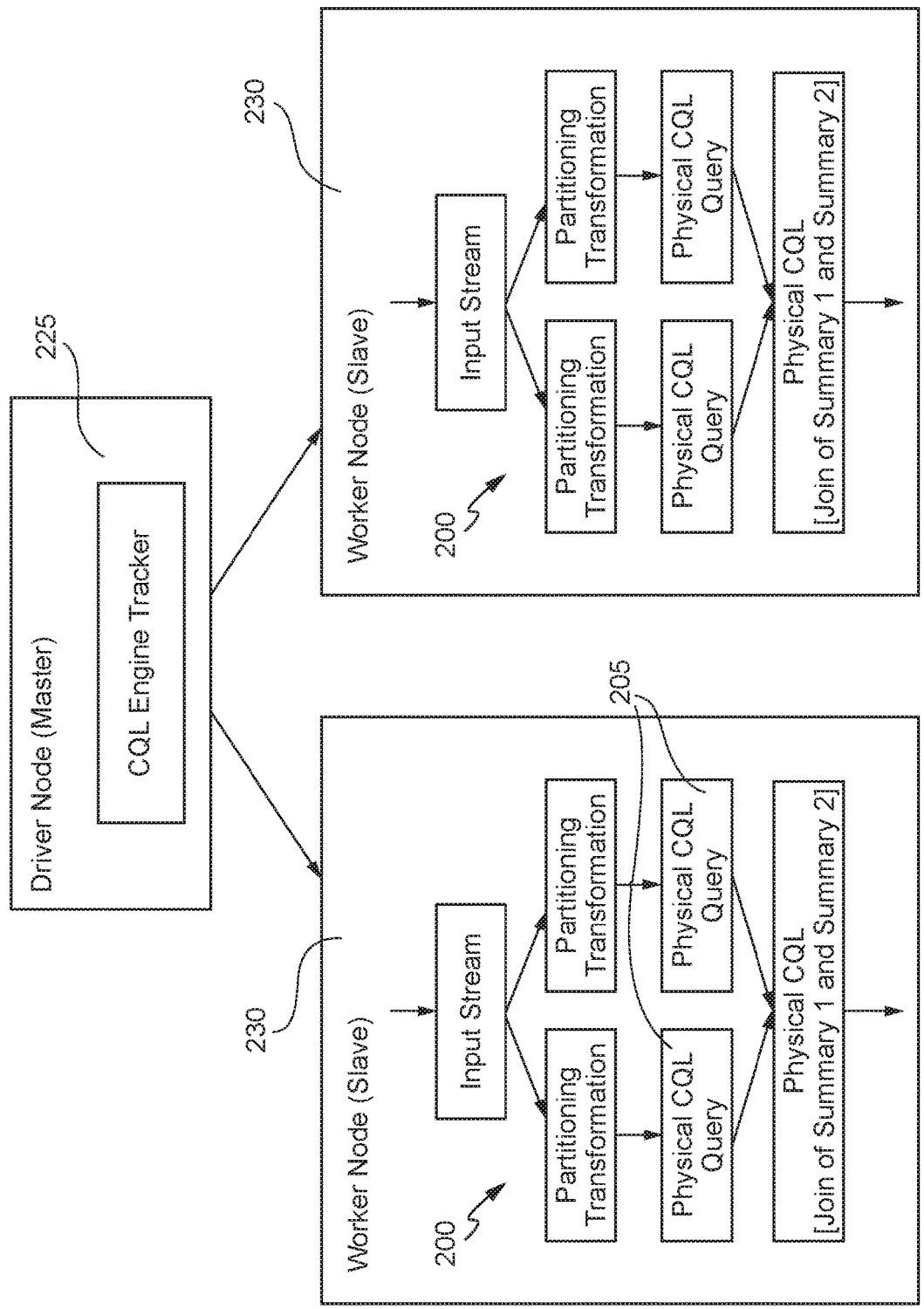

The group by attribute ad_category is acted upon or part of the function or transformation that causes the query stage or physical CQL query to not exhibited parallelism. In other words, in order to process the function or transformation without sharing state, the data of the input stream needs to be partitioned in such a manner that values associated with the attribute ad_category are not processed in parallel on multiple nodes without state. Instead, the data of the input stream is partitioned such that values associated with the attribute ad_category are maintained together and the continuous query can be computed on a same node or set of nodes. Once the partition criteria is determined for the query stage or physical CQL query, a partition transformation 220 is created based on the partition criteria and incorporated into the DAG 200 of executable transformations 205 created by the cluster, as shown in FIG. 2C. Once the DAG 200 of executable transformations 205 is created, a driver node 225 of the cluster can deploy the DAG 200 of executable transformations 205 to worker nodes 230 of the cluster and start computing transformations 205. As should be understood, the partition transformation 220 ensures that the data of the input stream is partitioned such that values associated with the partitioning criteria are maintained together and the transformation 205 is computed on a same node or set of nodes.

This solution is an improvement over prior industry solutions that utilize GROUP BY statements with aggregate functions. Currently this is not possible in a single CQL transformation stage. Instead, a user has to rely on multiple CQL transformation stages which involves join functions. For example, some databases permit two or more different GROUP BY statements to be used in different sub queries. Each of the sub queries is run as a CQL transformation on its own stage, and thus is simple and a DAG can be created and processed by the cluster for each CQL transformation on its own stage.

Framework for Logical Queries

Figure 3:
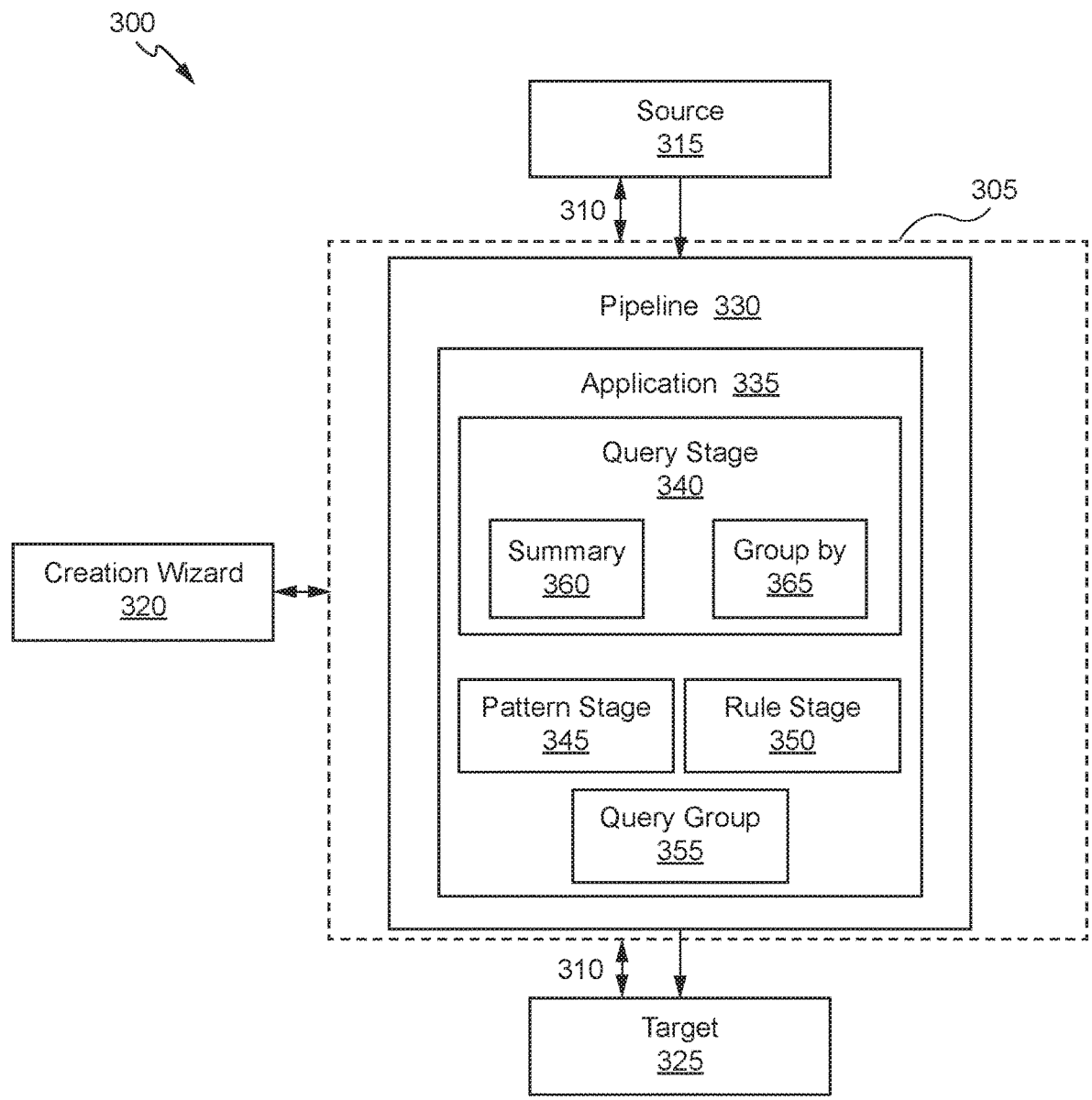
FIG. 3 is an illustration of a simplified high level diagram of a distributed processing system in accordance with various embodiments.

In various embodiments, systems, methods, and computer-readable media are disclosed for receiving and processing data streaming using a DAG of transformations on a cluster of distributed nodes. FIG. 3 illustrates a framework 300 for processing data streaming from one or more event sources in accordance with an exemplary embodiment using EPN 305 (e.g., EPN 100 as described with respect to FIG. 1). Specifically, EPN 305 may be configured with various entities that have one or more additional properties based on the entities type and purpose. In some embodiments, the entities include a connection 310. Connection 310 is a basic artifact and typically may be created using a catalog (e.g., a repository of entities that can be created by the user). The connection 310 may be a collection of metadata (such as URLs, credential and the like) required to connect to an external system. The connection 310 is the basis for the creation of sources (Streams, References or Geo Fences) and targets. Example of connections may include Kafka connections, database connections, and application or software package connections such as a GoldenGate connection (a software package for real-time data integration and replication services).

In some embodiments, the entities further include a source 315. In certain embodiments, source 315 is a stream or a source of dynamic data with an input shape. The connection 310 may implemented with the source 315 using a creation application (e.g., a wizard) 320, whereby a user selects the connection 310 and specifies the source 315, for example a Kafka topic or a URL, that represents the stream of data. In some embodiments, the entities further include a target 325. In certain embodiments, target 325 is an external system or destination where the results of the stream processing with an output shape are received. The connection 310 may implemented with the target 325 using the creation application 320, whereby a user selects the connection 310 and specifies the target 325, for example input for another pipeline or a URL. The some embodiments, the entities further include a pipeline 330 that define pipeline logic and is a sequence of data processing stages.

The pipeline 330 may comprise an event processing application 335 that is configured to listen to the data stream from source 315, execute a continuous query using a processor (e.g., a CQL processor) comprising logic for processing input data from the data stream. In various embodiments, the event processing application 235 includes a query plan with a logical CQL query, which may be represented as a directed acyclic graph (DAG) of physical operators or executable transformations, as described with respect to FIGS. 2A-2D. In some embodiments, a query stage 340 is used to configure the logical CQL query on the data stream from the source 315 and may comprise additional sources for joins, filters, subsections such as summaries, group by, and time windows, and so on. The event processing application 335 may further include a pattern stage 345, a rule stage 350, and/or a query group 355.

In various embodiments, the query stage 340 includes one or more summary subsections 360 and one or more group by subsections 365. The summary subsections 360 may be configured with the creation application 320 with logical syntax to include one or more aggregate functions (e.g., COUNT, MAX, MIN, SUM, AVG). In certain embodiments, the summary subsections 360 are configured with the creation application 320 to include multiple summaries executed in a single query stage using logical syntax. A DAG may be created for the logical CQL query and processed by a cluster for each CQL transformation on its own stage. Once the DAG of executable transformations is created, a driver node of the cluster can deploy the DAG of executable transformations to worker nodes of the cluster and start computing transformations.

Methods for Logical Queries

Figure 4:
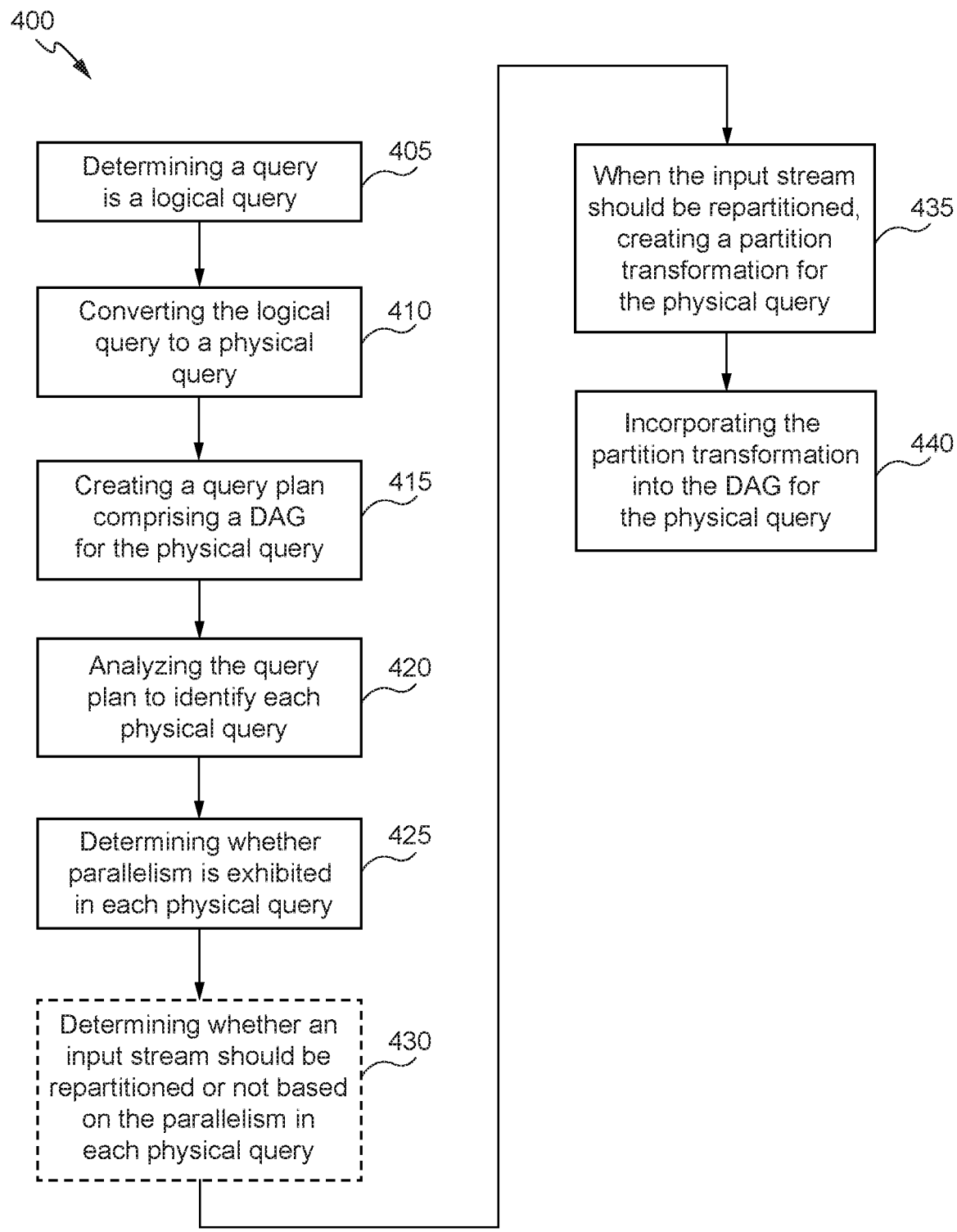
FIG. 4 depicts a flowchart illustrating a process for implementing a logical query in accordance with various embodiments.

FIG. 4 illustrates processes and operations for implementing fault-tolerant stream processing according to various embodiments. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted in FIG. 4 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIG. 4 is not intended to be limiting. Other sequences of steps may also be performed according to alternative embodiments. For example, in alternative embodiments the steps outlined above may be performed in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 4 shows a flowchart 400 that illustrates a process for implementing logical queries according to various embodiments. In some embodiments, the processes depicted in flowchart 400 may be implemented by the system of FIG. 1 and framework of FIG. 2. As shown in FIG. 4, at step 405 a query may be determined as a logical query using a data processing system (e.g., the EPN 210 as described with respect to FIG. 2). In some embodiments, the determination is made based on the syntax used to define the query (e.g., determining whether logical CQL syntax was used or physical CQL syntax was used). In some embodiments, the logical query includes two or more summaries based on different groups configured to execute in a single query stage of a stream analytics application. In some embodiments, logical syntax is used to convert a conventional query plan with physical queries for multiple summaries executed respectively in multiple query stages into a query plan with logical queries for multiple summaries executed in a single query stage. In other embodiments, a creation application is used to create a query plan with logical queries for multiple summaries executed in a single query stage using logical syntax. The logical syntax for the logical queries look like the following: function_identifier ([DISTINCT] arith_expr [BY group_by_attrs] [WITHIN window_spec] [WHERE condition]). In some embodiments, determining the query is a logical query further includes determining the logical query comprises a first summary (e.g., COUNT) based on a first group (e.g., ad_category) and a second summary (e.g., SUM) based on a second group (e.g., time_of_day). The first group is different from the second group and the logical query is configured to execute in a single query stage. For example, the logical query does not comprise syntax for multiple views and a join of output from the summaries.

In various embodiments, a DAG of executable transformations is determined from the logical query, which can be executed on a cluster of distributed nodes. At step 410, the logical query is converted into one or more physical queries. In some embodiments, upon determining that the query is expressed as a logical query, the logical query is parsed into multiple portions, for example, one portion for each function or summary. The logical syntax/semantics of each portion or summary are translated, by the cluster, into physical syntax/semantics for one or more physical queries such that a physical query is generated for each portion or summary. In some embodiments, the one or more physical queries are separated into individual query stages, and each of the query stages includes a summary from the two or more summaries that is based on an associated group. In some embodiments, converting the logical query to the one or more physical queries includes parsing the logical query into the first summary (e.g., COUNT) based on a first group (e.g., ad_category) and the second summary (e.g., SUM) based on a second group (e.g., time_of_day), and translating the logical syntax and semantics for the first summary (e.g., COUNT) based on a first group (e.g., ad_category) into physical syntax and semantics for a first physical query comprising the first summary (e.g., COUNT) based on a first group (e.g., ad_category) and physical syntax and semantics for a second physical query comprising the second summary (e.g., SUM) based on a second group (e.g., time_of_day). The first physical query is configured to execute in a first query stage of the stream analytics application and the second physical query is configured to execute in a second query stage of the stream analytics application.

Once the logical query is converted to the one or more physical queries, a DAG of executable transformations may be created comprising a transformation for each query stage corresponding to a summary (aggregate function) view (e.g., each physical query). At step 415, a DAG is generated for the one or more physical queries. In some embodiments, generating the DAG includes creating a physical query transformation for each of the individual query stages. Each of these query stages will receive the same input stream and compute the summary individually. In some embodiments, generating the DAG further includes creating a join transformation to join the output from each physical query transformation into a single output shape. In some embodiments, a query plan is created comprising the DAG for the physical query. In some embodiments, the DAG comprises the first query stage as a first physical query transformation, the second query stage as a second physical query transformation, and a join transformation to join the output from each of the first physical query transformation and the second physical query transformation into a single output shape.

At optional step 420, the query plan is analyzed to identify each query stage or each physical query within the query plan. In some embodiments, the analyzing the query plan includes parsing the query plan and determining each query stage or each physical query that is included within the query plan. At step 425, a determination is made as to whether parallelism is exhibited in each of the one or more physical queries. In some embodiments, the determining whether parallelism is exhibited for each identified query stage or physical query includes a determination of whether the function or transformation can be processed in parallel on multiple nodes without sharing state. For example, a sequential function such as COUNT could not be processed in parallel on multiple nodes without sharing state, and thus a query stage or physical query that includes the COUNT function or transformation would be determined to exhibit no parallelism. In some embodiments, determining parallelism includes determining that the first query stage does not exhibit parallelism, determining that the second query stage does not exhibit parallelism, or a combination thereof.

At step 430, when parallelism is not exhibited in a physical query of the one or more physical queries, a determination is made as to whether an input stream is to be partitioned or repartitioned for the physical query. In some embodiments, determining whether the input stream should be partitioned or repartitioned, or not, includes: (i) determining the input stream should not be partitioned or repartitioned when parallelism is exhibited for the query stage or the physical query, and (ii) determining the input stream should be partitioned or repartitioned when parallelism is not exhibited for the query stage or the physical query. In some embodiments, determining whether an input stream should be partitioned or repartitioned includes determining that the input stream should be partitioned or repartitioned for the query plan, determining that the input stream should be partitioned or repartitioned for the first query stage, determining that the input stream should be partitioned or repartitioned for the second query stage, or a combination thereof.

At step 435, when the input stream is to be partitioned or repartitioned for the physical query, creating a partition transformation for the physical query. Alternatively, when there is parallelism and the input stream should not be partitioned or repartitioned, a partitioning transformation is not created for the physical query. In some embodiments, creating the partitioning transformation includes creating the partitioning transformation for the query plan, creating the partitioning transformation for the first query stage, creating the partitioning transformation for the second query stage, or a combination thereof. In some embodiments, the partition transformation is incorporated into the directed acyclic graph prior to the physical query transformation for the physical query.

Figure 5:
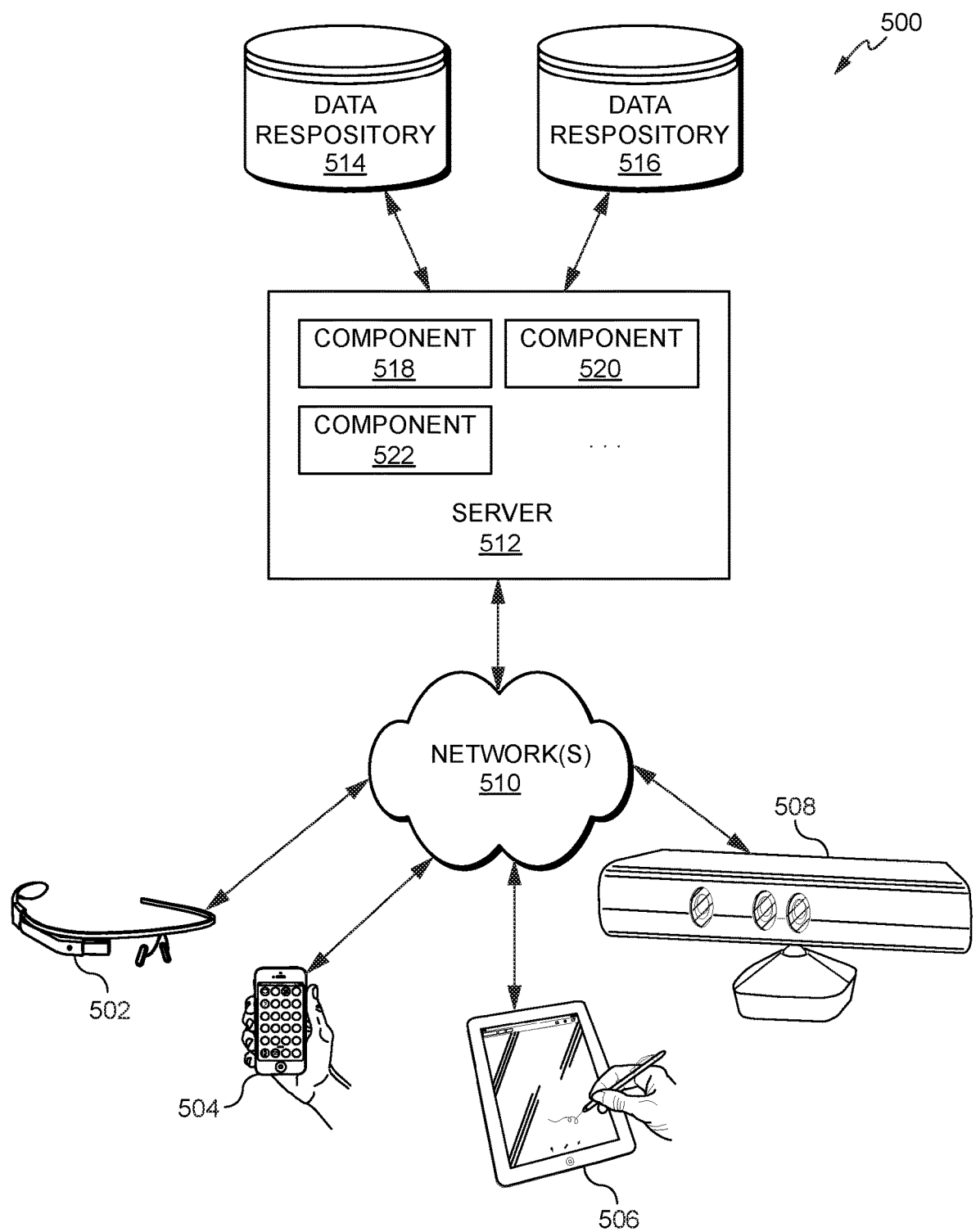
FIG. 5 depicts a simplified diagram of a distributed system for implementing various embodiments.

In some embodiments, the creating the partitioning transformation for the DAG includes determining a partitioning criteria for the query stage or the physical query. The partitioning criteria may be an attribute within the physical syntax of the physical query. In some embodiments, the partitioning criteria may be the attribute within the physical syntax that is acted upon or part of the function or transformation that causes the query stage or physical query to not exhibited parallelism. For example, group by attribute may be acted upon or part of the function or transformation that causes the query stage or physical query to not exhibited parallelism. In other words, in order to process the function or transformation without sharing state, the data of the input stream needs to be partitioned in such a manner that values associated with the attribute are not processed in parallel on multiple nodes without state. Instead, the data of the input stream is partitioned such that values associated with the attribute are maintained together and the continuous query can be computed on a same node or set of nodes. Once the partition criteria is determined for the query stage or physical query, a partition transformation is created based on the partition criteria and incorporated into the DAG created by the cluster. At step 440, the partition transformation is incorporated into the DAG for the physical query or query plan. Once the DAG is created, a driver node of the cluster can deploy the DAG to worker nodes of the cluster and start computing transformations on the input stream. As should be understood, the partition transformation ensures that the data of the input stream is partitioned such that values associated with the partitioning criteria are maintained together and the transformation 205 is computed on a same node or set of nodes Illustrative Systems FIG. 5 depicts a simplified diagram of a distributed system 500 for implementing an embodiment. In the illustrated embodiment, distributed system 500 includes one or more client computing devices 502, 504, 506, and 508, coupled to a server 512 via one or more communication networks 510. Clients computing devices 502, 504, 506, and 508 may be configured to execute one or more applications.

In various embodiments, server 512 may be adapted to run one or more services or software applications that enable receiving and processing data streaming from an event source.

In certain embodiments, server 512 may also provide other services or software applications that can include non-virtual and virtual environments. In some embodiments, these services may be offered as web-based or cloud services, such as under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in FIG. 5, server 512 may include one or more components 518, 520 and 522 that implement the functions performed by server 512. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, and/or 508 to receive and process data streaming from an event source in accordance with the teachings of this disclosure. A client device may provide an interface that enables a user of the client device to interact with the client device. The client device may also output information to the user via this interface. Although FIG. 5 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 510 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 510 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines running virtual operating systems, or other computing architectures involving virtualization such as one or more flexible pools of logical storage devices that can be virtualized to maintain virtual storage devices for the server. In various embodiments, server 512 may be adapted to run one or more services or software applications that provide the functionality described in the foregoing disclosure.

The computing systems in server 512 may run one or more operating systems including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more data repositories 514, 516. These data repositories may be used to store data and other information in certain embodiments. For example, one or more of the data repositories 514, 516 may be used to store information such as an output of events. Data repositories 514, 516 may reside in a variety of locations. For example, a data repository used by server 512 may be local to server 512 or may be remote from server 512 and in communication with server 512 via a network-based or dedicated connection. Data repositories 514, 516 may be of different types. In certain embodiments, a data repository used by server 512 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 514, 516 may also be used by applications to store application data. The data repositories used by applications may be of different types such as, for example, a key-value store repository, an object store repository, or a general storage repository supported by a file system.

Figure 6:
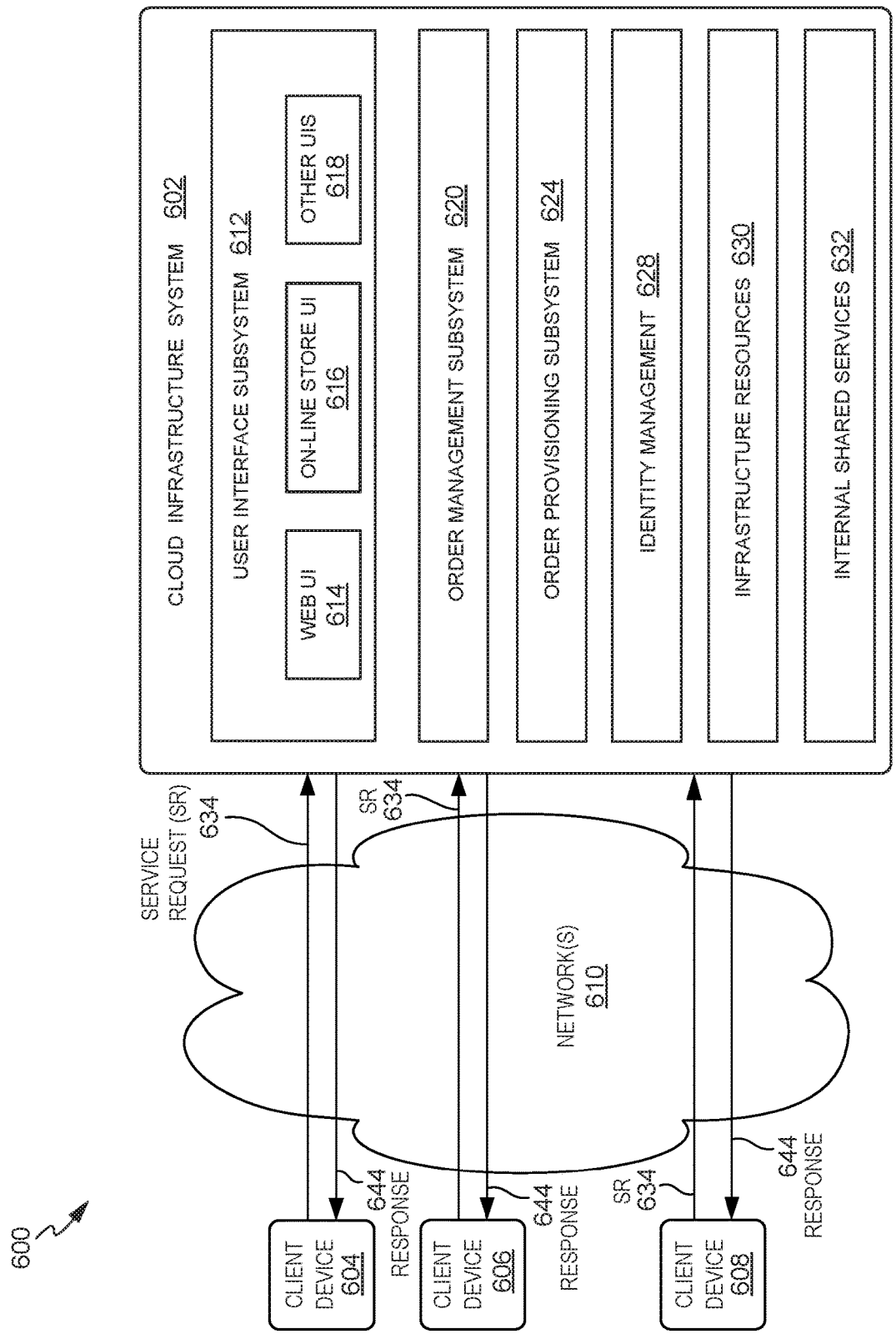
FIG. 6 is a simplified block diagram of one or more components of a system environment by which services provided by one or more components of an embodiment system may be offered as cloud services, in accordance with various embodiments.

In certain embodiments, the data stream processing functionalities described in this disclosure may be offered as services via a cloud environment. FIG. 6 is a simplified block diagram of a cloud-based system environment in which various streaming analytic services may be offered as cloud services, in accordance with certain embodiments. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server

512. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

The embodiment depicted in FIG. 6 is only one example of a cloud infrastructure system and is not intended to be limiting. It should be appreciated that, in some other embodiments, cloud infrastructure system 602 may have more or fewer components than those depicted in FIG. 6, may combine two or more components, or may have a different configuration or arrangement of components. For example, although FIG. 6 depicts three client computing devices, any number of client computing devices may be supported in alternative embodiments.

The term cloud service is generally used to refer to a service that is made available to users on demand and via a communication network such as the Internet by systems (e.g., cloud infrastructure system 602) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 602 may provide one or more cloud services using different models such as under a Software as a Service (SaaS) model, a Platform as a Service (PaaS) model, an Infrastructure as a Service (IaaS) model, and others, including hybrid service models. Cloud infrastructure system 602 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 602. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 602. Cloud infrastructure system 602 then performs processing to provide the services requested in the customer's subscription order. For example, receiving and processing data streaming from an event source. Cloud infrastructure system 602 may be configured to provide one or even multiple cloud services.

Cloud infrastructure system 602 may provide the cloud services via different deployment models. In a public cloud model, cloud infrastructure system 602 may be owned by a third party cloud services provider and the cloud services are offered to any general public customer, where the customer can be an individual or an enterprise. In certain other embodiments, under a private cloud model, cloud infrastructure system 602 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 602 and the services provided may be shared by several organizations in a related community. Various other models such as hybrids of the above mentioned models may also be used.

Client computing devices 604, 606, and 608 may be of different types (such as devices 502, 504, 506, and 508 depicted in FIG. 5) and may be capable of operating one or more client applications. A user may use a client device to interact with cloud infrastructure system 602, such as to request a service provided by cloud infrastructure system 602. For example, a user may use a client device to request a streaming analytic service described in this disclosure.

In some embodiments, the processing performed by cloud infrastructure system 602 for providing streaming analytic services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 602 for processing data streaming from an event source. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like.

In certain embodiments, to facilitate efficient provisioning of these resources for supporting the various cloud services provided by cloud infrastructure system 602 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 602 may itself internally use services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 602 may comprise multiple subsystems. These subsystems may be implemented in software, or hardware, or combinations thereof. As depicted in FIG. 6, the subsystems may include a user interface subsystem 612 that enables users or customers of cloud infrastructure system 602 to interact with cloud infrastructure system 602. User interface subsystem 612 may include various different interfaces such as a web interface 614, an online store interface 616 where cloud services provided by cloud infrastructure system 602 are advertised and are purchasable by a consumer, and other interfaces 618. For example, a customer may, using a client device, request (service request 634) one or more services provided by cloud infrastructure system 602 using one or more of interfaces 614, 616, and 618. For example, a customer may access the online store, browse cloud services offered by cloud infrastructure system 602, and place a subscription order for one or more services offered by cloud infrastructure system 602 that the customer wishes to subscribe to. The service request may include information identifying the customer and one or more services that the customer desires to subscribe to. For example, a customer may place a subscription order for a streaming analytic related service offered by cloud infrastructure system 602. As part of the order, the customer may provide information identifying a source of streaming data.

In certain embodiments, such as the embodiment depicted in FIG. 6, cloud infrastructure system 602 may comprise an order management subsystem (OMS) 620 that is configured to process the new order. As part of this processing, OMS 620 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 620 may then invoke the order provisioning subsystem (OPS) 624 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 602 may send a response or notification 644 to the requesting customer to indicate when the requested service is now ready for use. In some instances, information (e.g., a link) may be sent to the customer that enables the customer to start using and availing the benefits of the requested services. In certain embodiments, for a customer requesting the streaming analytic service, the response may include a target for output events.

Cloud infrastructure system 602 may provide services to multiple customers. For each customer, cloud infrastructure system 602 is responsible for managing information related to one or more subscription orders received from the customer, maintaining customer data related to the orders, and providing the requested services to the customer. Cloud infrastructure system 602 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 602 may provide services to multiple customers in parallel. Cloud infrastructure system 602 may store information for these customers, including possibly proprietary information. In certain embodiments, cloud infrastructure system 602 comprises an identity management subsystem (IMS) 628 that is configured to manage customers information and provide the separation of the managed information such that information related to one customer is not accessible by another customer. IMS 628 may be configured to provide various security-related services such as identity services, such as information access management, authentication and authorization services, services for managing customer identities and roles and related capabilities, and the like.

Figure 7:
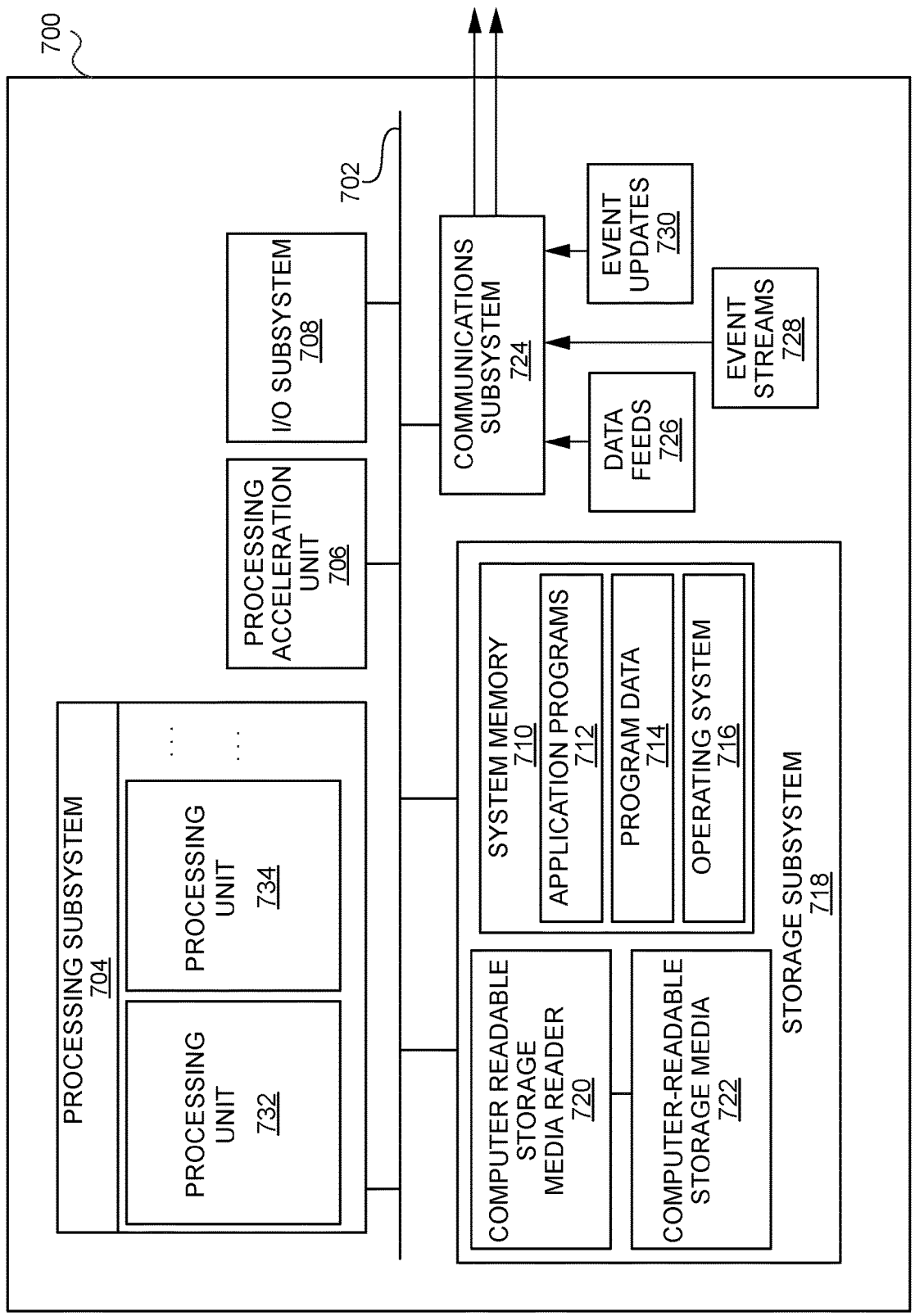
FIG. 7 illustrates an example computer system that may be used to implement various embodiments.

FIG. 7 illustrates an exemplary computer system 700 that may be used to implement certain embodiments. For example, in some embodiments, computer system 700 may be used to implement any of the event processing network 100 or 205 as described with respect to FIGS. 1 and 2, and various servers and computer systems described above. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain embodiments, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google) Glass®. Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some embodiments. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 722 may store programming and data constructs that provide the functionality of some embodiments. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 718 may also include a computer-readable storage media reader 720 that can further be connected to computer-readable storage media 722. Reader 720 may receive and be configured to read data from a memory device such as a disk, a flash drive, etc.

In certain embodiments, computer system 700 may support virtualization technologies, including but not limited to virtualization of processing and memory resources. For example, computer system 700 may provide support for executing one or more virtual machines. In certain embodiments, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. For example, the communication subsystem may be used to establish a connection with a source of streaming data.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method, comprising:
   determining, by a data processing system, a query is a logical query, wherein the logical query includes two or more summaries based on different group by statements configured to execute in a single query stage of a stream analytics application, wherein the determining the query is the logical query includes determining the logical query comprises a first summary of the two or more summaries based on a first group by statement of the different group by statements and a second summary of the two or more summaries based on a second group by statement of the different group by statements, and wherein the first group by statement is different from the second group by statement;
   converting, by the data processing system, the logical query into one or more physical queries, wherein the one or more physical queries are separated into individual query stages, and each of the query stages includes a summary from the two or more summaries that is based on an associated group by statement, wherein the converting the logical query into the one or more physical queries includes parsing the logical query into the first summary based on the first group by statement and the second summary based on the second group by statement, translating logical syntax and semantics for the first summary into physical syntax and semantics for a first physical query comprising the first summary based on the first group by statement, and translating logical syntax and semantics for the second summary into physical syntax and semantics for a second physical query comprising the second summary based on the second group by statement; and
   generating, by the data processing system, a directed acyclic graph for the one or more physical queries, wherein the directed acyclic graph includes a physical query transformation for each of the individual query stages.

2. The method of claim 1, wherein the first physical query is configured to execute in a first query stage and the second physical query is configured to execute in a second query stage.

3. The method of claim 2, wherein the directed acyclic graph comprises the first query stage as a first physical query transformation, the second query stage as a second physical query transformation, and a join transformation to join output from each of the first physical query transformation and the second physical query transformation into a single output shape.

4. A method, comprising:
   determining, by a data processing system, a query is a logical query, wherein the logical query includes two or more summaries based on different group by statements configured to execute in a single query stage of a stream analytics application;
   converting, by the data processing system, the logical query into one or more physical queries, wherein the one or more physical queries are separated into individual query stages, and each of the query stages includes a summary from the two or more summaries that is based on an associated group by statement;
   generating, by the data processing system, a directed acyclic graph for the one or more physical queries, wherein the directed acyclic graph includes a physical query transformation for each of the individual query stages;

determining, by the data processing system, whether parallelism is exhibited in each of the one or more physical queries;

when parallelism is not exhibited in a physical query of the one or more physical queries, determining, by the data processing system, an input stream is to be partitioned or repartitioned for the physical query; and when the input stream is to be partitioned or repartitioned for the physical query, creating, by the data processing system, a partition transformation for the physical query, wherein the partition transformation is incorporated into the directed acyclic graph prior to the physical query transformation for the physical query, and wherein the creating the partition transformation includes determining a partitioning criteria for the physical query, wherein the partitioning criteria is an attribute within physical syntax of the physical query that is acted upon or part of a function or transformation that causes the physical query to not exhibited parallelism.

5. A system comprising:

a data processing system that includes one or more processors and non-transitory machine readable storage medium having instructions stored thereon that when executed by the one or more processors cause the one or more processors to perform the process comprising:

determining, by the data processing system, a query is a logical query, wherein the logical query includes two or more summaries based on different group by statements configured to execute in a single query stage of a stream analytics application, wherein the determining the query is the logical query includes determining the logical query comprises a first summary of the two or more summaries based on a first group by statement of the different group by statements and a second summary of the two or more summaries based on a second group by statement of the different group by statements, and wherein the first group by statement is different from the second group by statement;

converting, by the data processing system, the logical query into one or more physical queries, wherein the one or more physical queries are separated into individual query stages, and each of the query stages includes a summary from the two or more summaries that is based on an associated group by statement, wherein the converting the logical query into the one or more physical queries includes parsing the logical query into the first summary based on the first group by statement and the second summary based on the second group by statement, translating logical syntax and semantics for the first summary into physical syntax and semantics for a first physical query comprising the first summary based on the first group by statement, and translating logical syntax and semantics for the second summary into physical syntax and semantics for a second physical query comprising the second summary based on the second group by statement; and generating, by the data processing system, a directed acyclic graph for the one or more physical queries, wherein the directed acyclic graph includes a physical query transformation for each of the individual query stages.

6. The system of claim 5, wherein the first physical query is configured to execute in a first query stage and the second physical query is configured to execute in a second query stage.

7. The system of claim 6, wherein the directed acyclic graph comprises the first query stage as a first physical query transformation, the second query stage as a second physical query transformation, and a join transformation to join output from each of the first physical query transformation and the second physical query transformation into a single output shape.

8. A system comprising:

a data processing system that includes one or more processors and non-transitory machine readable storage medium having instructions stored thereon that when executed by the one or more processors cause the one or more processors to perform the process comprising:

determining, by the data processing system, a query is a logical query, wherein the logical query includes two or more summaries based on different group by statements configured to execute in a single query stage of a stream analytics application;

converting, by the data processing system, the logical query into one or more physical queries, wherein the one or more physical queries are separated into individual query stages, and each of the query stages includes a summary from the two or more summaries that is based on an associated group by statement;

generating, by the data processing system, a directed acyclic graph for the one or more physical queries, wherein the directed acyclic graph includes a physical query transformation for each of the individual query stages;

determining, by the data processing system, whether parallelism is exhibited in each of the one or more physical queries;

when parallelism is not exhibited in a physical query of the one or more physical queries, determining, by the data processing system, an input stream is to be partitioned or repartitioned for the physical query; and when the input stream is to be partitioned or repartitioned for the physical query, creating, by the data processing system, a partition transformation for the physical query, wherein the partition transformation is incorporated into the directed acyclic graph prior to the physical query transformation for the physical query, and wherein the creating the partition transformation includes determining a partitioning criteria for the physical query, wherein the partitioning criteria is an attribute within physical syntax of the physical query that is acted upon or part of a function or transformation that causes the physical query to not exhibited parallelism.

9. A non-transitory machine readable storage medium having instructions stored thereon that when executed by one or more processors cause the one or more processors to perform a method comprising:

determining a query is a logical query, wherein the logical query includes two or more summaries based on different group by statements configured to execute in a single query stage of a stream analytics application, wherein the determining the query is the logical query includes determining the logical query comprises a first summary of the two or more summaries based on a first group by statement of the different group by statements and a second summary of the two or more summaries based on a second group by statement of the different group by statements, and wherein the first group by statement is different from the second group by statement;

converting the logical query into one or more physical queries, wherein the one or more physical queries are separated into individual query stages, and each of the query stages includes a summary from the two or more summaries that is based on an associated group by statement, wherein the converting the logical query into the one or more physical queries includes parsing the logical query into the first summary based on the first group by statement and the second summary based on the second group by statement, translating logical syntax and semantics for the first summary into physical syntax and semantics for a first physical query comprising the first summary based on the first group by statement, and translating logical syntax and semantics for the second summary into physical syntax and semantics for a second physical query comprising the second summary based on the second group by statement; and generating a directed acyclic graph for the one or more physical queries, wherein the directed acyclic graph includes a physical query transformation for each of the individual query stages.

10. The non-transitory machine readable storage medium of claim 9, wherein the first physical query is configured to execute in a first query stage and the second physical query is configured to execute in a second query stage.

11. The non-transitory machine readable storage medium of claim 10, wherein the directed acyclic graph comprises the first query stage as a first physical query transformation, the second query stage as a second physical query transformation, and a join transformation to join output from each of the first physical query transformation and the second physical query transformation into a single output shape.

12. A non-transitory machine readable storage medium having instructions stored thereon that when executed by one or more processors cause the one or more processors to perform a method comprising:

determining a query is a logical query, wherein the logical query includes two or more summaries based on different group by statements configured to execute in a single query stage of a stream analytics application;

converting the logical query into one or more physical queries, wherein the one or more physical queries are separated into individual query stages, and each of the query stages includes a summary from the two or more summaries that is based on an associated group by statement;

generating a directed acyclic graph for the one or more physical queries, wherein the directed acyclic graph includes a physical query transformation for each of the individual query stages;

determining whether parallelism is exhibited in each of the one or more physical queries;

when parallelism is not exhibited in a physical query of the one or more physical queries, determining an input stream is to be partitioned or repartitioned for the physical query; and when the input stream is to be partitioned or repartitioned for the physical query, creating a partition transformation for the physical query, wherein the partition transformation is incorporated into the directed acyclic graph prior to the physical query transformation for the physical query, and wherein the creating the partition transformation includes determining a partitioning criteria for the physical query, wherein the partitioning criteria is an attribute within physical syntax of the physical query that is acted upon or part of a function or transformation that causes the physical query to not exhibited parallelism.

* * * * *

UNITED STATES PATENT AND TRADEMARK OFFICE
CERTIFICATE OF CORRECTION

PATENT NO. : 10,877,971 B2  
APPLICATION NO. : 16/147622  
DATED : December 29, 2020  
INVENTOR(S) : Bishnoi et al.

Page 1 of 1

It is certified that error appears in the above-identified patent and that said Letters Patent is hereby corrected as shown below:

In the Drawings

On sheet 7 of 9, in FIG. 5, under Reference Numeral 514, Line 2, delete "RESPOSITORY" and insert -- REPOSITORY --, therefor.

On sheet 7 of 9, in FIG. 5, under Reference Numeral 516, Line 2, delete "RESPOSITORY" and insert -- REPOSITORY --, therefor.

In the Specification

In Column 16, Line 16, delete "SesnsorId," and insert -- SensorId, --, therefor.

In Column 16, Line 29, delete "SesnsorId," and insert -- SensorId, --, therefor.

In Column 32, Line 39, delete "nodes" and insert -- nodes. --, therefor.

In Column 40, Line 13, delete "Google) Glass®." and insert -- Google Glass®). --, therefor.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*